United States Patent
Jensen et al.

(10) Patent No.: US 10,940,460 B2
(45) Date of Patent: *Mar. 9, 2021

(54) PROCESS TO PRODUCE MODIFIED CLAY, MODIFIED CLAY PRODUCED AND USE THEREOF

(71) Applicant: W. R. Grace & Co.-Conn., Columbia, MD (US)

(72) Inventors: Michael D. Jensen, Laurel, MD (US); John Robert McCauley, Finksburg, MD (US); Andrew G. Singleton, Ellicott City, MD (US); Demetrius Michos, Clarksville, MD (US)

(73) Assignee: W. R. Grace & Co.-Conn., Columbia, MD (US)

( * ) Notice: Subject to any disclaimer, the term of this patent is extended or adjusted under 35 U.S.C. 154(b) by 450 days.

This patent is subject to a terminal disclaimer.

(21) Appl. No.: 15/572,675

(22) PCT Filed: May 9, 2016

(86) PCT No.: PCT/US2016/031467
§ 371 (c)(1),
(2) Date: Nov. 8, 2017

(87) PCT Pub. No.: WO2016/183008
PCT Pub. Date: Nov. 17, 2016

(65) Prior Publication Data
US 2018/0142048 A1 May 24, 2018

Related U.S. Application Data

(60) Provisional application No. 62/159,539, filed on May 11, 2015.

(51) Int. Cl.
| | | |
|---|---|---|
| *B01J 21/16* | (2006.01) | |
| *B01J 23/10* | (2006.01) | |
| *C08F 4/6592* | (2006.01) | |
| *B01J 29/04* | (2006.01) | |
| *C08F 10/02* | (2006.01) | |

(52) U.S. Cl.
CPC ............ *B01J 21/16* (2013.01); *B01J 23/10* (2013.01); *B01J 29/049* (2013.01); *C08F 4/65925* (2013.01); *C08F 4/65927* (2013.01); *C08F 10/02* (2013.01); *C08F 2410/01* (2013.01)

(58) Field of Classification Search
None
See application file for complete search history.

(56) References Cited

U.S. PATENT DOCUMENTS

| | | |
|---|---|---|
| 2,196,016 A | 4/1940 | Huehn et al. |
| 3,242,099 A | 3/1966 | Manyik et al. |
| 3,248,179 A | 4/1966 | Norwood |
| 4,176,090 A | 11/1979 | Vaughan et al. |
| 4,248,739 A | 2/1981 | Vaughan et al. |
| 4,424,341 A | 1/1984 | Hanson et al. |
| 4,501,885 A | 2/1985 | Sherk et al. |
| 4,542,118 A | 9/1985 | Nozemack et al. |
| 4,613,484 A | 9/1986 | Ayres et al. |
| 4,661,464 A | 4/1987 | Atkins |
| 4,737,280 A | 4/1988 | Hanson |
| 4,761,391 A | 8/1988 | Occelli |
| 4,775,461 A * | 10/1988 | Harris .................... B01J 29/049 208/113 |
| 4,794,096 A | 12/1988 | Ewen |
| 4,808,561 A | 2/1989 | Welborn, Jr. |
| 4,939,217 A | 7/1990 | Stricklen |

(Continued)

FOREIGN PATENT DOCUMENTS

| | | |
|---|---|---|
| CN | 1162295 A | 10/1997 |
| CN | 102039181 A | 5/2011 |

(Continued)

OTHER PUBLICATIONS

International Search Report for Appln No. 11201709181W, dated Oct. 31, 2018, pp. 1-2.
Takahashi T, Nakano H, Uchino H, Tayano T, Sugano T. Study of clay mineral"support-activator" in metallocene catalyst. In Abstracts of Papers of the American Chemical Society Aug. 18, 2002 (vol. 224, pp. U383-U383). 1155 16th St, NW, Washington, DC 20036 USA: Amer Chemical Soc.
Teagarden, D.L. et al., "Conversion of aluminum chlorohydrate to aluminum hydroxide", J. Soc. Cosmet. Chem, vol. 33, Sep.-Oct. 1982, pp. 281-295.
Tettenhorst R, Roberson HE. X-ray diffraction aspects of montmorillonites. The American Mineralogist. Jan. 1973;58 (1-2):73-80.
Thomas, S.M. and Occelli, M.L., "Effects of Synthesis Conditions on the Thermal Stability of a Texas Montmorillonite Expanded With [Al13O4(OH)24(H2O)12]7+ Cations", Clays and Clay Minerals, vol. 48, No. 2, Apr. 1, 2000, pp. 304-308.

(Continued)

*Primary Examiner* — Sheng H Davis
(74) *Attorney, Agent, or Firm* — Lerner, David, Littenberg, Krumholz & Mentlik, LLP

(57) ABSTRACT

An intercalated, modified and calcined smectite clay comprising (a) pillars comprising aluminum and: (i) at least one rare earth or lanthanide group metal; or (ii) at least one rare earth or lanthanide group metal and gallium; and (b) at least one ion-exchanged metal selected from the group consisting of aluminum, barium, beryllium, calcium, cerium, cesium, copper, chromium, gadolinium, gallium, germanium, hafnium, holmium, iron (II and III), lanthanum, lithium, magnesium, manganese, neodymium, potassium, praseodymium, rubidium, samarium, silver, selenium, sodium, strontium, tellurium, terbium, thallium, thorium, tin, titanium, uranium, ytterbium, yttrium, zinc and zirconium; wherein the clay is characterized by a basal $d_{001}$ spacing equal to or greater than about 18.5 angstroms; and processes for making. The modified clays are suitably used as catalyst support-activators and when used in combination with metallocene catalyst precursor components, can provide active catalysts for polymerizing at least one olefin, preferably in the substantial absence of aluminoxanes or boron-containing compounds.

20 Claims, No Drawings

(56) References Cited

U.S. PATENT DOCUMENTS

| | | |
|---|---|---|
| 4,952,544 A | 8/1990 | McCauley |
| 4,995,964 A * | 2/1991 | Gortsema ............. B01J 29/049 |
| | | 208/111.01 |
| 5,059,568 A | 10/1991 | McCauley |
| 5,079,203 A | 1/1992 | Pinnavaia et al. |
| 5,084,209 A | 1/1992 | Burba, III et al. |
| 5,191,132 A | 3/1993 | Patsidis et al. |
| 5,202,295 A | 4/1993 | McCauley |
| 5,210,352 A | 5/1993 | Alt et al. |
| 5,214,211 A | 5/1993 | Kurek et al. |
| 5,308,811 A | 5/1994 | Suga et al. |
| 5,324,800 A | 6/1994 | Welborn, Jr. et al. |
| 5,347,026 A | 9/1994 | Patsidis et al. |
| 5,362,825 A | 11/1994 | Hawley et al. |
| 5,389,593 A | 2/1995 | Holmgren |
| 5,399,636 A | 3/1995 | Alt et al. |
| 5,401,817 A | 3/1995 | Palackal et al. |
| 5,420,320 A | 5/1995 | Zenk et al. |
| 5,436,305 A | 7/1995 | Alt et al. |
| 5,451,649 A | 9/1995 | Zenk et al. |
| 5,480,848 A | 1/1996 | Geerts |
| 5,486,499 A * | 1/1996 | Davies ................... B01J 20/12 |
| | | 502/81 |
| 5,496,781 A | 3/1996 | Geerts et al. |
| 5,498,581 A | 3/1996 | Welch et al. |
| 5,541,272 A | 7/1996 | Schmid et al. |
| 5,554,795 A | 9/1996 | Frey et al. |
| 5,563,284 A | 10/1996 | Frey et al. |
| 5,565,592 A | 10/1996 | Patsidis et al. |
| 5,571,880 A | 11/1996 | Alt et al. |
| 5,576,259 A | 11/1996 | Hasegawa et al. |
| 5,594,078 A | 1/1997 | Welch et al. |
| 5,597,892 A | 1/1997 | Hanson |
| 5,631,203 A | 5/1997 | Welch et al. |
| 5,631,335 A | 5/1997 | Alt et al. |
| 5,654,454 A | 8/1997 | Peifer et al. |
| 5,668,230 A | 9/1997 | Schertl et al. |
| 5,705,478 A | 1/1998 | Boime |
| 5,705,579 A | 1/1998 | Hawley et al. |
| 5,753,577 A | 5/1998 | Hamura et al. |
| 5,786,290 A | 7/1998 | Colombo et al. |
| 5,807,938 A | 9/1998 | Kaneko et al. |
| 5,830,820 A | 11/1998 | Yano et al. |
| 5,906,955 A | 5/1999 | Hamura et al. |
| 5,919,983 A | 7/1999 | Rosen et al. |
| 5,928,982 A | 7/1999 | Suga et al. |
| 5,942,459 A | 8/1999 | Sugano et al. |
| 5,973,084 A | 10/1999 | Suga et al. |
| 6,080,827 A | 6/2000 | Fujioka et al. |
| 6,187,710 B1 | 2/2001 | Vogels et al. |
| 6,353,063 B1 | 3/2002 | Shimizu et al. |
| 6,355,594 B1 | 3/2002 | McDaniel et al. |
| 6,376,421 B2 | 4/2002 | Sun et al. |
| 6,399,535 B1 | 6/2002 | Shih et al. |
| 6,465,543 B1 | 10/2002 | Alexandre et al. |
| 6,521,559 B1 | 2/2003 | Long et al. |
| 6,531,552 B2 | 3/2003 | Nakano et al. |
| 6,559,090 B1 | 5/2003 | Shih et al. |
| 6,632,894 B1 | 10/2003 | McDaniel et al. |
| 6,767,975 B1 | 7/2004 | Liu |
| 6,846,943 B2 | 1/2005 | Nakano et al. |
| 6,984,603 B2 | 1/2006 | McDaniel et al. |
| 6,995,279 B2 | 2/2006 | Ushioda et al. |
| 7,041,753 B2 | 5/2006 | McDaniel et al. |
| 7,148,298 B2 | 12/2006 | Jensen et al. |
| 7,273,914 B2 | 9/2007 | Wang et al. |
| 7,291,575 B2 | 11/2007 | Shih |
| 7,390,764 B2 | 6/2008 | McDaniel et al. |
| 7,429,634 B2 | 9/2008 | Brant et al. |
| 7,476,639 B2 | 1/2009 | Koch et al. |
| 7,572,875 B2 | 8/2009 | Jensen et al. |
| 7,622,414 B2 | 11/2009 | McDaniel et al. |
| 7,732,542 B2 | 6/2010 | Yang et al. |
| 8,309,485 B2 | 11/2012 | Yang et al. |
| 8,309,748 B2 | 11/2012 | Ding et al. |
| 8,318,872 B2 | 11/2012 | Savatsky et al. |
| 8,614,277 B2 | 12/2013 | Kiss et al. |
| 8,759,246 B2 | 6/2014 | Ding et al. |
| 2001/0053833 A1 | 12/2001 | Nakano et al. |
| 2002/0004447 A1 | 1/2002 | Nakano et al. |
| 2002/0099154 A1 | 7/2002 | Hamed et al. |
| 2003/0027950 A1 | 2/2003 | Uchino et al. |
| 2003/0171207 A1 | 9/2003 | Shih et al. |
| 2004/0176242 A1 | 9/2004 | Ishihama et al. |
| 2004/0241427 A1 * | 12/2004 | Zhu ..................... B01J 35/1061 |
| | | 428/328 |
| 2005/0148743 A1 | 7/2005 | Casty et al. |
| 2005/0288461 A1 | 12/2005 | Jensen et al. |
| 2006/0040822 A1 | 2/2006 | Shveima et al. |
| 2007/0179044 A1 | 8/2007 | Yang et al. |
| 2011/0190460 A1 | 8/2011 | Jayaratne et al. |
| 2012/0077665 A1 | 3/2012 | Ding et al. |
| 2013/0059140 A1 | 3/2013 | Hlavinka et al. |
| 2013/0317185 A1 | 11/2013 | Fantinel et al. |
| 2014/0107301 A1 | 4/2014 | Buck et al. |
| 2014/0213747 A1 | 7/2014 | Hlavinka et al. |
| 2014/0235804 A1 | 8/2014 | Masino et al. |

FOREIGN PATENT DOCUMENTS

| | | |
|---|---|---|
| DE | 19727257 A1 | 1/1998 |
| EP | 0250168 A1 | 12/1987 |
| EP | 0279251 A1 | 8/1988 |
| EP | 0279251 * | 5/1990 |
| EP | 0658576 B1 | 7/1998 |
| EP | 0945471 A1 | 9/1999 |
| EP | 1160261 A1 | 12/2001 |
| EP | 1247573 A1 | 10/2002 |
| JP | H0733814 A | 2/1995 |
| JP | H09132613 A2 | 5/1997 |
| JP | H10139807 A | 5/1998 |
| JP | 2000264913 A | 9/2000 |
| JP | 2001299204 A | 10/2001 |
| JP | 2002208785 A | 7/2002 |
| JP | 2003105015 A | 4/2003 |
| JP | 2003113209 A | 4/2003 |
| JP | 2003113210 A | 4/2003 |
| JP | 2003128719 A | 5/2003 |
| JP | 2004059828 A | 2/2004 |
| JP | 3635822 B2 | 4/2005 |
| JP | 2005206777 A | 8/2005 |
| JP | 3772472 B2 | 5/2006 |
| RU | 2404921 C1 | 11/2010 |
| WO | 9623010 A2 | 8/1996 |
| WO | 9910389 A1 | 3/1999 |
| WO | 2000011044 A1 | 3/2000 |
| WO | 2001032721 A1 | 5/2001 |
| WO | 2001042320 A1 | 6/2001 |
| WO | 2003002616 A1 | 1/2003 |
| WO | 2003004412 A1 | 1/2003 |
| WO | 2007082122 A2 | 7/2007 |
| WO | 2008036594 A3 | 7/2008 |
| WO | 2013160022 A1 | 10/2013 |
| WO | 2016183006 A1 | 11/2016 |

OTHER PUBLICATIONS

Tokarz M, Shabtai J. Cross-linked smectites. IV. Preparation and properties of hydroxyaluminum-pillared Ce-and La-montmorillonites and fluorinated NH 4+-montmorillonites. Clays and Clay Minerals. Apr. 1, 1985;33(2):89-98.

Tullo, Alexander H., "Single Site Success", Chemical & Engineering News, vol. 79, No. 43, Oct. 22, 2001, pp. 35-36.

Valverde, J.L. et al., "Enhanced Thermal Stability of A1-Pillared Smectites Modified With Ce and La", Clays and Clay Minerals, vol. 48, No. 4, Aug. 2000, pp. 424-432.

Volclay HPM 20 Technical Sheet revised May 25, 2001.

W.R. Grace & Co.-Conn., "Aluminum Chlorohydrate Product Stewardship Summary" Feb. 18, 2000.

Wei, Liangming et al., "Synthesis and characterization of polyethylene/clay-silica nanocomposites: A montmorillonite/silica-hybrid-

(56) References Cited

OTHER PUBLICATIONS supported catalyst and in situ polymerization", Journal of Polymer Science, Part A: Polymer Chemistry, vol. 42, Issue 4, Feb. 15, 2004, pp. 941-949.

Weiss, K. et al., "Polymerisation of ethylene or propylene with heterogenous metallocene catalysts on clay minerals", Journal of Molecular Catalysis A: Chemical, vol. 182-183, May 2002, pp. 143-149.

Willenbacher N. Unusual thixotropic properties of aqueous dispersions of laponite RD. Journal of Colloid and Interface Science. Sep. 25, 1996;182(2):501-10.

Yamada, Hirohisa et al., "Hydration Behavior of Na-Smectite Crytslas Synthesized at High Pressure and High Temperature" ,Clays and Clay Minerals, vol. 42, No. 1, Feb. 1, 1994, pp. 77-80.

Yang, R.T. & Cheng L.S., "Pillared Clays and Ion-Exchanged Pillared Clays as Gas Adsorbents and as Catalysts for Selective Catalytic Reduction of No," Access in Naoporous Materials, Copyright 2002, ISBN: 978-0-306-45218-5, pp. 73-92.

Yonge, David T., "A Comparison of Aluminum and Iron-Based Coagulants for Treatment of Surface Water in Sarasota County, Florida," Thesis submitted Fall, 2012, pp. 1-126.

Zhu Hy, Lu GQ. Pore structure tailoring of pillared clays with cation doping techniques. Journal of Porous Materials. Sep. 1, 1998; vol. 5, Nos. 3-4, pp. 227-239.

Anadão, Priscila, "Clay-Containing Polysulfone Nanocomposites", Chapter 6, Nanotechnology and Nanomaterials: advances in Nanocomposite Technology, edited by Abbass Hashim, published Jul. 27, 2011, pages.

Aowda, Saadon A., Emad A. Jaffar Al-Mulla, and Sadiq J. Baqir. "Modification of montmorillonite, using different phosphonium salts, study their effect upon the structure." J. Al-qadisiyah Pure Sci 16 (2011): 1-10.

ASTM D4284-07 "A Standard Test method for Determining Pore Volume Distribution of Catalysts by Mercury Intrusion Porosimetry," ASTM Internationa, West Conshohocken, PA, 2007, www.astm.org.

Barrett, E.P. et al., "The Determination of Pore Volume and Area Distributions in Porous Substances. I. Computations from Nitrogen Isotherms", Journal of the American Chemical Society, vol. 73, No. 1, Jan. 1951, pp. 373-380.

Belelli, Patricia Gabriela; Eberhardt, Andrea Mariel; Ferreira, María Luján; Dos Santos, Joao; Daniel Eduardo, Damiani; "Metallocene heterogeneization on acid supports," Recent Research Developments in Polymer Science 2004; p. 223-245.

Bergaya, F. et al., "Cation and Anion Exchange", Handbook of Clay Science, First Edition, Chapter 12.10, edited by F. Bergaya, B.K.G. Theng and G. Lagaly, Sep. 11, 2006, pp. 979-1001.

Bergaya, F. et al., "Modified Clays and Clay Minerals", Handbook of Clay Science, First Edition, Chapter 7, Edited by F. Bergaya, B.K.G. Theng, and G. Lagaly, Sep. 11, 2006, pp. 261-263.

Booij, ER et al., "Preparation, structural characteristics and catalytic properties of large-pore rare earth element (Ce, La)/Al-pillared smectites.", Clays and Clay Minerals. 1996 (accepted Feb. 14, 1996). vol. 44. No. 6; pp. 774-780.

Bradley, S.M. et al, "Characterization of the GaO4Al12(OH)24(H2O)127+ Polyoxocation by MAS NMR and Infrared Spectroscopies and Powder X-Ray Diffraction", Inorganic Chemistry, vol. 31, No. 7, Apr. 1, 1992, pp. 1181-1185.

Breen, C. et al., "Organometallic cation-exchanged phyllosilicates. Variable-temperature 57Fe Moessbauer spectroscopic and related studies of the adsorption of dimethylaminomethylferrocene on clays and pillared clays", Journal of Materials Chemistry, vol. 6, No. 5, (1996), pp. 849-859.

Brunauer, S. et al., "Adsorption of Gases in Multimolecular Layers", Journal of the American Chemical Society, vol. 60, No. 2, Feb. 1938, pp. 309-319.

Cozak, D. et al., "The Catalytic Properties of a New Titanium-Clay Mineral Catalyst. Hydrogenation and Polymerization of Olefins by Chrysotile Supported Titanium", Studies in Surface Sciences and Catalysis, vol. 19 (Sep. 30-Oct. 3, 1984), pp. 403-410.

Delblem, Maria Flavia et al., "Modification of a Brazilian Smectite Clay with Different Quaternary Ammonium Salts", Quimica Nova, vol. 33, No. 2, Jan. 11, 2010, pp. 309-315.

Duong, L. V. (2008). The morphology and structure of intercalated and pillared clays (Doctoral dissertation, Queensland University of Technology).

Flego, Cristina et al., "The influence of the composition on the thermal and acid characteristic of multi-component oxide pillared montmorillonite", Applied Catalysis A: General, vol. 168, Issue 2, Mar. 27, 1998, pp. 323-331.

Gil, Antonio et al., Recent Advances in the Synthesis and Catalytic Applications of Pillared Clays, Catalysis Reviews, vol. 42, Issues 1-2, (2000), published online Feb. 5, 2007, pp. 145-212.

Gitipour S, Hosseinpour MA, Heidarzadeh N, Yousefi P, Fathollahi A. Application of modified clays in geosynthetic clay liners for containment of petroleum contaminated sites. International Journal of Environmental Research. Jan. 1, 2015;9(1):317-22.

Guseva, I.V. & Èidus, YA. T., "Catalytic hydrocondesnation of carbon monoxide with olefins and their hydropolymerization under the action of carbon monoxide and hydrogen", Bulletin of the Academy of Sciences of the USSR, Division of Chemical Science, vol. 18, No. 5, May 1969, pp. 968-972 (translated from Izvetiya Akademii Nauk SSSR, Seriya Khimicheskaya, No. 5, pp. 1059-1065, May 1969).

Hall PL, Astill DM. Adsorption of water by homoionic exchange forms of Wyoming montmorillonite(SWy-1). Clays and Clay Minerals. Aug. 1, 1989;37(4):355-63.

Haouzi, A., Kharroubi, M., Belarbi, H., Devautour-Vinot, S., Henn, F., & Giuntini, J. C. (2004). Activation energy for dc conductivity in dehydrated alkali metal-exchanged montmorillonites: experimental results and model. Applied clay science, 27(1-2), 67-74.

International Search Report for Application PCT/US2016/031464 dated Aug. 18, 2016.

International Search Report for Application PCT/US2016/31464 dated Aug. 18, 2016.

Jeong, Dong Wook et al., "The Effect of Water and Acidity of the Clay for Ethylene Polymerization over Cp2ZrCl2 Supported on TMA-Modified Clay Materials", Journal of Molecular Catalysis A: Chemical, vol. 206, Issues 1-2, Oct. 2003, pp. 205-211.

Kirk-Othmer Encyclopedia of Chemical Technology, vol. 6, Chlorocarbons and Clorohydrocarbons-C2 to Combustion Technology, Mary Howe-Grant, Editor, published by John Wiley & Sons, 1993, pp. 383-394.

Kloprogge, Theo J. et al., "Comments on "Enhanced Thermal Stability of Al-Pillared Smectites Modified with Ce and La" by J.L. Valverde, P.Cañizares, M.R. Sun Kou and C.B. Molina", Clays and Clay Minerals, vol. 49, No. 2, Apr. 2001, pp. 183-185.

Kooli, F., Sasaki, T., Mizukami, F., Watanabe, M., Martin, C., & Rives, V. (2001). Characterization and acidic properties of silica pillared titanates Journal of Materials Chemistry, 11(3), 841-845.

Levy, Rachel et al., "Calcium-Magnesium Exchange in Montmorillonite and Vermiculite", Clays and Clay Minerals, vol. 20, No. 1, Feb. 1972, pp. 37-46.

Lewis, D.R., "Ion Exchange Reaction of Clays", Clays and Clay Minerals, vol. 1, Issue 1, 1952, pp. 54-69.

Loeppert RH. Synthesis and Properties of Heat-Stable Expanded Smectite and Vermiculite1. Clays and Clay Minerals. 1979;27:201-8.

Malla, P.B. & Komarneni, S., "Properties and Characterization of Al2O3 and SiO2—TiO2 Pillared Saponite," Clay and Clay Minerals, vol. 41, No. 4, accepted Jun. 7, 1993, pp. 472-483.

Marques, Maria & Tiosso, Rodrigo, "Brazilian Mineral Clay as Support for Metallocene Catalyst in the Synthesis of Polyethylene", Chemistry & Chemical Technology, vol. 4, No. 2 (2010), pp. 139-146.

McAtee, J.L. Jr., "Heterogeneity in Montmorillonite", Fifth National Conference of Clays and Clay Minerals, National Academy of Sciences, National Research Council, Publication 566, Oct. 8-10, 1956, pp. 279-288.

Nagendrappa G. Organic synthesis using clay and clay-supported catalysts. Applied Clay Science. Aug. 1, 2011;53(2):106-38.

(56) References Cited

OTHER PUBLICATIONS

Nakano H, Takahashi T, Uchino H, Tayano T, Sugano T. Polymerization behavior with metallocene catalyst supported by clay mineral activator. In Studies in Surface Science and Catalysis Jan. 1, 2006 (vol. 161, pp. 19-24).

Norris J, Giese RF, Costanzo PM, Van Oss CJ. "The Surface Energies of Cation Substituted Laponite," Clay Minerals. Mar. 1, 1993;28:1-11.

Occelli, M.L. and Tindwa, R.M., "Physicochemical Properties of Montmorillonite Interlayed With Cationic Oxyaluminum Pillars", Clays and Clay Minerals, vol. 31, No. 1, Feb. 1, 1983, pp. 22-28.

Occelli, M.L. et al., "Physicochemical characterization of a Texas montmorillonite pillared with polyoxocations of aluminum. II. NMR and microcalorimetry results", Microporous and Mesoporous Materials, vol. 39, Feb. 14, 2000, pp. 43-56.

Parada, A. et al, "The influence of support in Ziegler-Natta catalysts for olefin polymerization", Revista Tecnica de la Facultad de Ingenieria, Universidad de Zulia, vol. 17, No. 3, pp. 157-164,1994.

Peacor, D. R., Murray, H., Stanjek, H., & Stanjek, J. S. The Clay Minerals Society Glossary for Clay Science Project.

Periodic Table of the Elements published by the International Union of Pure and Applied Chemistry (IUPAC), published online at http://old.iupac.org/reports/periodic_table/; version dated Feb. 19, 2010.

Ritter HL, Drake LC. Pressure porosimeter and determination of complete macropore-size distributions. Pressure porosimeter and determination of complete macropore-size distributions. Industrial & Engineering Chemistry Analytical Edition. Dec. 1, 1945; vol. 17, No. 12, pp. 782-786.

Romero A, Dodorado F, Asencio I, Garcia PB, Valverde JL "Ti-pillared clays: synthesis and general characterization". Clays and Clay Minerals. Dec. 1, 2006;54(6):737-47.

Rong, J-F., Z-H. Jing, and X-Y. Hong. "Study on Ethylene Polymerization Catalyst Prepared from Clay Minerals I. Ethylene Polymerization Catalyst Supported on Palygorskite." Petrochemical Technology 32.12 (2003): 1032-1036.

Rotenberg, Benjamin et al., "On the driving force of cation exchange in clays: Insights from combined microcalorimetry experiments and molecular simulation", Geochimica et Cosmochimica Acta, vol. 73, Apr. 16, 2009, pp. 4034-4044.

Rutherford, D.W. et al., "Effects of Exchanged Cation on the Microporosity of Montmorillonite", Clays and Clay Minerals, vol. 45, No. 4, Aug. 1997, pp. 534-543.

Sanabria NR, Centeno MA, Molina R, Moreno S. "Pillared clays with Al—Fe and Al—Ce—Fe in concentrated medium: synthesis and catalytic activity." Applied Catalysis A: General. Mar. 15, 2009;356(2):243-9.

Schoonheydt, R.A. et al., "Pillared Clays and Pillared Layered Solids", Pure and Applied Chemistry, vol. 71, Issue 12, Dec. 1999, pp. 2367-2371.

Schutz, A. et al., "Preparation and Characterization of Bidimensional Zeolitic Structures Obtained From Synthetioc Beidellite and Hydroxy-Aluminum Solutions," Clays and Clay Minerals, vol. 35, No. 4, accepted Jan. 7, 1987, pp. 251-261.

Suzuki, Kenzi, and Toshiaki Mori. "Synthesis of alumina-pillared clay with desired pillar population using Na-montmorillonite having controlled cation exchage capacity." Journal of the Chemical Society, Chemical Communications 1 (1989): 7-8.

Tabernero, V. et al., "Silicoaluminates as "Support Activator" Systems in Olefin Polymerization Processes", Materials, vol. 3, Feb. 3, 2010, pp. 1015-1030.

Search Report for Appln No. 11201709180Q dated Oct. 13, 2018, pp. 1-2.

Russian Search Report for Application No. 2017142713, dated Dec. 31, 2019, 2 pages.

Russian Search Report for Application No. 2017142712, dated Dec. 30, 2019, 2 pages.

Chinese Search Report for Application No. 2016800410304 dated Dec. 18, 2019, 3 pages.

Extended European Search Report and Written Opinion for EP Application No. 16793319.1, dated Jan. 30, 2019.

Zhu, et al., "Porosity and Thermal Stability of Montmorillonite Pillared with Mixed Oxides of Lanthanum, Calcium and Aluminium", Journal of Porous Materials, vol. 4, No. 1, Mar. 1997, pp. 17-26.

Search Report from Brazilian Office Action for BR112017024302-4 dated Apr. 28, 2020; 1 page.

\* cited by examiner

PROCESS TO PRODUCE MODIFIED CLAY, MODIFIED CLAY PRODUCED AND USE THEREOF

CROSS-REFERENCE TO RELATED APPLICATIONS

The present application is a national phase entry under 35 U.S.C. § 371 of International Application No. PCT/US2016/031467, filed May 9, 2016, which claims priority from U.S. Provisional Application Ser. No. 62/159,539, filed May 11, 2015, the disclosures of which are hereby incorporated herein by reference.

BACKGROUND OF THE INVENTION

Polymers, including homopolymers and interpolymers or copolymers are produced in very large quantities worldwide. In particular, olefin polymers form a significant part of such worldwide production. Catalyst technology is required for producing such polymers and research continues to find improvements for such catalysts.

A major group of catalysts in the field of olefin polymerization are known as metallocenes and includes many individual members. While providing desirable polymer properties, heterogeneous metallocene catalysts are typically used in combination with activators such as aluminoxane or borates, in order to obtain metallocene catalysts or catalyst systems having greater activity. However, aluminoxane and borate activators are both expensive and difficult to handle, particularly in a commercial setting, and thus there is a continuing need for improved activators.

Heterogeneous metallocene catalysts are typically supported on a substrate; one such substrate or support comprises clay in various forms. One form of clay used for supports is known as intercalated or pillared clay. By combining properties of a support such as pillared clay with those of an activator, heterogeneous metallocene catalysts can be further improved.

The inventors herein provide advances in catalyst supports and methods of preparing such supports relating to pillared and further modified clays, which helps to address the problems and continuing needs in the field of heterogeneous polymer catalysis and heterogeneous metallocene catalysts in particular.

BRIEF SUMMARY OF THE INVENTION

An embodiment of the invention comprises intercalated modified and calcined smectite clay comprising: (a) pillars comprising aluminum and: (i) at least one rare earth or lanthanide group metal; or (ii) at least one rare earth or lanthanide group metal and gallium; and (b) at least one ion-exchanged metal selected from the group consisting of aluminum, barium, calcium, cerium, cesium, copper, chromium, gadolinium, gallium, germanium, hafnium, holmium, iron (II and III), lanthanum, lithium, magnesium, manganese, neodymium, potassium, praseodymium, rubidium, samarium, silver, selenium, sodium, strontium, tellurium, terbium, thallium, thorium, tin, titanium, uranium, ytterbium, yttrium, zinc and zirconium; wherein said clay is characterized by a basal $d_{001}$ spacing equal to or greater than about 18.5 angstroms.

In a further embodiment of the invention there is provided process for producing an intercalated modified and calcined smectite clay composition comprising steps: (A) contacting an aqueous slurry comprising a smectite clay with an aqueous pillaring agent comprising aluminum and: (i) at least one rare earth or lanthanide group metal; or (ii) at least one rare earth or lanthanide group metal and gallium; to form a solids-containing phase and an aqueous phase; (B) separating the solids-containing phase from the aqueous phase formed in (A); (C) contacting the separated solids obtained in (B) at least once with an aqueous $Met_mX_n$ composition comprising at least one $Met_mX_n$ compound, wherein $Met_m$ is at least one metal ion selected from the group consisting of aluminum, barium, calcium, cerium, cesium, copper, chromium, gadolinium, gallium, germanium, hafnium, holmium, iron (II and III), lanthanum, lithium, magnesium, manganese, neodymium, potassium, praseodymium, rubidium, samarium, silver, selenium, sodium, strontium, tellurium, terbium, thallium, thorium, tin, titanium, uranium, ytterbium, yttrium, zinc and zirconium, and $X_n$ comprises at least one anionic species; and m and n=numerals that together satisfy the valence requirement for the combination of $Met_m$ and $X_n$, to form a mixture comprising a solids-containing phase and an aqueous phase; (D) separating the aqueous phase formed in (C) in order to form a new solids-containing phase; (E) drying the separated, solids-containing phase from (D) in order to obtain dry solids and reducing said dry solids to a dry, particulate form; and (F) calcining the dry, particulate from (E) to form a dry, pillared, solid catalyst support-activator in particulate form.

Another embodiment comprises a process for producing an intercalated modified and calcined smectite clay composition comprising steps: (A) contacting an aqueous slurry comprising a smectite clay with an aqueous pillaring agent comprising aluminum and: (i) at least one rare earth or lanthanide group metal; or (ii) at least one rare earth or lanthanide group metal and gallium; to form a solids-containing phase and an aqueous phase; (B) separating the solids-containing phase from the aqueous phase formed in (A) and repeatedly extracting the solids-containing phase with water and separating the water from the solids until the separated water is free or substantially free of: (i) residual anions originally present in the aqueous pillaring agent; or (ii) unconsumed pillaring agent or byproduct thereof; or (iii) both (i) and (ii); (C) contacting the solids obtained in (B) at least once with an aqueous $Met_mX_n$ composition comprising at least one $Met_mX_n$ compound, wherein $Met_m$ is at least one metal ion selected from the group consisting of aluminum, barium, calcium, cerium, cesium, copper, chromium, gadolinium, gallium, germanium, hafnium, holmium, iron (II and III), lanthanum, lithium, magnesium, manganese, neodymium, potassium, praseodymium, rubidium, samarium, silver, selenium, sodium, strontium, tellurium, terbium, thallium, thorium, tin, titanium, uranium, ytterbium, yttrium, zinc and zirconium, and $X_n$ comprises at least one anionic species; and m and n=numerals that together satisfy the valence requirement for the combination of $Met_m$ and $X_n$, to form a mixture comprising a solids-containing phase and an aqueous phase; (D) separating the aqueous phase formed in (C) in order to form a new solids-containing phase and contacting and mixing the new solids-containing phase with a new portion of aqueous $Met_mX_n$ composition, wherein Met and $X_n$ are the same or different chemical species as selected in (C) and mixing and separating the resulting mixture comprising a solids-containing phase and an aqueous phase; (E) optionally repeating step (D) at least one additional time, wherein following the last mixing and contacting with the $Met_mX_n$ composition, water-washing by introducing distilled or de-ionized water to the separated solids-containing phase to form a solids-containing composition, mixing and separating the composition into a solids-containing phase and an aqueous phase; (F) repeating the water-washing of step (E) until the separated aqueous phase is free or substantially free of $X_n$ ions in order to obtain a washed solids-containing phase; (G) drying the washed solids-containing phase from (F) in order to obtain dry solids and reducing said dry solids to a dry, particulate form; and (H) calcining the dry, particulate from (G) to form a dry, solid catalyst support-activator in particulate form.

And further embodiments comprise intercalated modified and calcined smectite clays produced by one or more of the processes disclosed herein, which are suitable for use as an olefin polymerization catalyst support-activator.

DETAILED DESCRIPTION

Clays such as layered, naturally occurring and synthetic smectites, such as bentonite, montmorillonites and hectorites, may be visualized as a "sandwich" composed of two outer layers, sheets or platelets of silicate tetrahedra and an inner layer, sheet or platelet of alumina or hydroxide octahedra; such a structure is also used to characterize the clay as a 2:1 clay. These "sandwiches" or layers are stacked one upon the other to yield a clay particle. Normally this arrangement yields a repeated structure about every nine and one-half angstroms. Pillared or intercalated clays are produced by the insertion of "pillars" of inorganic oxide material between these layers to provide a larger space between the natural clay layers.

The present invention provides methods for producing pillared clays having a wider layer spacing, and which are further modified by ion exchange with a metal salt to provide metallocene catalyst supports demonstrating significant polymerization activity even in the absence or substantial absence of aluminoxane or borate activators. Such a support is also sometimes referred to as an activator-support or support-activator.

The product of the invention is a stable, microporous catalytic component comprising layered, colloidal clay having expanded molecular layers with a multiplicity of pillars interposed between the molecular layers of the clay and further modified with an ion exchanged metal such as zinc or magnesium, although, as will be disclosed, other ion exchange metals are also suitable. The pillars and/or the intercalated layers per se typically comprise aluminum, preferably including at least one rare earth or lanthanide group element or metal, or at least one rare earth or lanthanide group metal and gallium, an ion exchanged metal and oxygen. The resulting product has relatively large pores and possesses a considerable volume of internal porosity. The intercalated calcined clays of the invention provide excellent supports for preparing metallocene polymerization catalysts. Upon intercalation, the material is dried and subjected to heat treatment to stabilize the expanded layers. The open, porous network of the expanded clay is stabilized by the intercalated aluminum-rare earth or lanthanide element-oxygen structures between the interlayers of the clay. The pillared clay undergoes a further ion exchange with, for example, a zinc or magnesium salt. The three-dimensional pillared clay comprises stable inorganic structures of (i) aluminum or other pillaring metal(s), preferably (ii) at least one rare earth or lanthanide element(s) or rare earth or lanthanide element(s) and gallium, (iii) oxygen and (iv) at least one ion-exchanged metal ion selected from the group consisting of aluminum, antimony, arsenic, barium, beryllium, calcium, cerium, cesium, copper, chromium, gadolinium, germanium, hafnium, holmium, iron (II and III), lanthanum, lithium, magnesium, manganese, neodymium, osmium, potassium, praseodymium, rubidium, samarium, silver, selenium, sodium, strontium, tellurium, terbium, thallium, thorium, tin, titanium, uranium, ytterbium, yttrium, zinc and zirconium; in a preferred embodiment the ion exchanged metal is zinc or magnesium.

The term "intercalation" is a term of art which indicates the insertion of a material between the layers of a clay substrate. J. R. McCauley in U.S. Pat. No. 5,202,295, incorporated herein by reference to the extent permitted, is an example of a reference which uses the term in the same way it is used and understood herein.

Additional Definitions

In order to more clearly define the terms and phrases used herein, the following definitions are provided. To the extent that any definition or usage provided by any document incorporated herein by reference conflicts with the definition or usage provided herein, the definition or usage provided herein controls.

The term "about" when used as a modifier for, or in conjunction with, a variable, characteristic or condition is intended to convey that the numbers, ranges, characteristics and conditions disclosed herein are flexible and that practice of the present invention by those skilled in the art using temperatures, rates, times, concentrations, amounts, contents, properties such as basal spacing, size, including pore size, pore volume, surface area, etc., that are outside of the stated range or different from a single stated value, will achieve the desired result or results as described in the application, namely, preparation of porous catalyst carrier particles having defined characteristics and their use in preparing active olefin polymerization catalysts and olefin polymerization processes using such catalysts.

The terms "a," "an," "the," etc., are intended to include plural alternatives, e.g., at least one, unless otherwise specified. For instance, the disclosure of "a catalyst support-activator," "an organoaluminum compound," or "a metallocene compound" is meant to encompass one, or mixtures or combinations of more than one, catalyst support-activator, organoaluminum compound, or metallocene compound, respectively.

The phrase "basal spacing" or "basal $d_{001}$ spacing" when used in the context of smectite clays such as montmorillonite, refers to the distance, usually expressed in angstroms or nanometers, between similar faces of adjacent layers in the clay structure. Thus, for example, in the 2:1 family of smectite clays, including montmorillonite, the basal distance is the distance from the top of a tetrahedral sheet to the top of the next adjacent tetrahedral sheet and including the intervening octahedral sheet (with or without modification or pillaring). Basal spacing values are measured using X-ray diffraction analysis (XRD) of the $d_{001}$ plane. The general literature for natural montmorillonite as found for example in bentonite, discloses a basal spacing range of about 12 Å to about 15 Å. (see, for example, Fifth National Conference on Clays and Clay Minerals, National Academy of Sciences, National Research Council, Publication 566, 1958: Proceedings of the Conference: "Heterogeneity In Montmorillonite", J. L. McAtee, Jr., 279-88, p. 282, Table 1). The International Union of Pure and Applied Chemistry (IUPAC) provides a suitable definition of basal spacing as measured using X-ray diffraction:

"Basal spacing: powder XRD pattern after removal of the solvent, e.g. heating at 120° C. in air or $N_2$ (or Ar or He) for the removal of water. The XRD pattern must show clearly the $d_{001}$ line, but a rational series of $d_{001}$ lines is not required." (Pillared Clays and Pillared Layered Solids, R. A. Schoonheydt et al., Pure Appl. Chem., Vol. 71, No. 12, pp. 2367-2371, 2369 (1999))

The XRD test method for determining basal spacing is described in, for example, U.S. Pat. No. 5,202,295 (McCauley) at col. 27, lns. 22-43.

"Comprise" or "comprising": Throughout the entire specification, including the claims, the word "comprise" and variations of the word, such as "comprising" and "comprises," as well as "have," "having," "includes," "include" and "including," and variations thereof, means that the named steps, elements, components or materials to which it refers are essential, but other steps, elements, components or materials may be added and still form a construct within the scope of the claim or disclosure. When recited in describing the invention and in a claim, it means that the invention and what is claimed is considered to be what follows and potentially more. These terms, particularly when applied to claims, are inclusive or open-ended and do not exclude additional, unrecited elements, components or methods steps.

"Group" or "Groups": Any reference to a Group or Groups of the Periodic Table of the Elements is preferably to the Group or Groups as reflected in the Periodic Table of Elements using the IUPAC system for numbering groups of elements as Groups 1-18. However, to the extent that a Group is identified by a Roman numeral according, for example, to the Periodic Table of the Elements as published in "Hawley's Condensed Chemical Dictionary" (2001) (the "CAS" system) it will further identify one or more Element of that Group so as to avoid confusion and provide a cross-reference to the numerical IUPAC identifier.

The term "hydrocarbyl" is used to specify a hydrocarbon radical group that includes, but is not limited to aryl, alkyl, cycloalkyl, alkenyl, cycloalkenyl, cycloalkadienyl, alkynyl, aralkyl, aralkenyl, aralkynyl, and the like, and includes all substituted, unsubstituted, branched, linear, heteroatom substituted derivatives thereof.

The terms "catalyst composition," "catalyst mixture," "catalyst system," and the like, do not depend upon the actual product or composition resulting from the contact or reaction of the initial components of the claimed catalyst composition/mixture/system, the nature of the active catalytic site, or the fate of the co-catalyst, the metallocene compound(s), or the activator (e.g., support-activator), after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst" and "catalyst system" or catalyst composition are sometimes used interchangeably herein, which use can be apparent from the context of the disclosure.

The term "cocatalyst" is generally used herein to refer to the organoaluminum compounds that may constitute one component of the catalyst composition, but also refers to the optional components of the catalyst composition including, but not limited to, aluminoxanes, organoboron compounds, or ionizing compounds, as disclosed herein. In one aspect, cocatalysts may be organoaluminum compounds of the formula $Al(X^5)_n(X^6)_{3-n}$, wherein $(X^5)$ is a hydride or hydrocarbyl having from 1 to about 20 carbon atoms; $(X^6)$ is an anionic species independently selected from the group consisting of a halide selected from the group consisting of chloride, iodide, fluoride and bromide; bromate; chlorate; perchlorate; sulfate; sulfamate; carbonate; hydrogen-carbonate; carbamate; nitrite; nitrate; oxalate; phosphate; selenate; sulfamate; azide; alkoxide; amide, including $NR_2$ or $R[CON(R)]_a$, wherein R is independently H or a $C_1$-$C_{20}$ unsubstituted or substituted hydrocarbyl group and a=1-4; and carboxylate, including $R[CO_2]_b$, wherein R is independently H or a $C_1$-$C_{20}$ unsubstituted or substituted hydrocarbyl group and b=1-4; and n is a number from 1 to 3, inclusive. The term cocatalyst may be used regardless of the actual function of the compound or any chemical mechanism by which the compound may operate.

The term "metallocene," as used herein, describes a compound comprising at least one if to $\eta^3$ to $\eta^5$-cycloalkadienyl-type moiety, wherein if to $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands may include H (a hydrogen atom); therefore this invention comprises partially saturated ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene is referred to simply as the "catalyst," in much the same way the term "co-catalyst" is used herein to refer to, for example, an organoaluminum compound.

The term "activator," as used herein, refers generally to a substance that is capable of converting a metallocene component into a catalyst that can polymerize olefins, or converting a contact product of a metallocene component and a component that provides an activatable ligand (e.g., an alkyl, a hydride) to the metallocene, when the metallocene compound does not already comprise such a ligand, into a catalyst that can polymerize olefins. This term is used regardless of the actual activating mechanism. Illustrative activators include support-activator, aluminoxanes, organoboron or organoborate compounds, ionizing compounds, and the like. Aluminoxanes, organoboron or organoborate compounds, and ionizing compounds can be referred to as activators if used in a catalyst composition in which a support-activator is present, but is supplemented by one or more aluminoxane, organoboron, organoborate or ionizing compounds. When the catalyst composition contains a support-activator, then the aluminoxane, organoboron or organoborate, and ionizing materials are typically referred to as co-catalysts.

The term "activity" or "catalyst composition activity", refers to polymerization activity of a catalyst composition comprising a pillared, ion-exchanged and dried/calcined clay disclosed herein, which is typically expressed as weight of polymer polymerized per weight of catalyst clay support-activator (absent the metal-containing catalyst components, such as metallocene and organoaluminum compounds) per hour of polymerization. In other words, the weight of polymer produced divided by the weight of pillared, ion-exchanged and dried/calcined clay per hour, i.e., g/g/hr. Activity of a reference or comparative catalyst composition refers to a catalyst composition that has not been both pillared and ion exchanged. Activity of catalysts produced according to the methods and compositions disclosed herein are greater than a catalyst composition that uses the same organometal or metallocene compound, and the same organoaluminum compound, and uses pillared clay, optionally comprising a rare earth or lanthanide series metal, but that has not been ion exchanged as disclosed herein. Furthermore, "increased or improved activity" disclosed herein means that the activity of a catalyst composition comprising a pillared, ion-exchanged and dried/calcined clay as taught herein is equal to or greater than about 300 grams of polyethylene polymer per gram of pillared, ion-exchanged, calcined clay per hour (g/g/hr) using a standard set of ethylene homopolymerization conditions as described in the examples hereinafter. Such conditions include the following: 2 L stainless steel reactor equipped with a marine type impeller typically set for 500 rpm, slurry polymerization conditions including 1 L purified isobutane diluent, 90° C. polymerization temperature, 450 total psi ethylene pressure, 60 minute run length (typical), metallocene catalyst composition comprising (1-Bu-3-MeCp)$_2$ZrCl$_2$ with triisobutylaluminum (TIBAL) cocatalyst, preferably using a metallocene stock solution containing TIBAL, which is charged in an amount to provide a metallocene to clay ratio of about 7×10$^{-5}$ mmol metallocene/mg calcined clay.

The term "contact product" is used herein to describe compositions wherein the components are contacted together in any order, unless a specific order is stated or implied by the context of the disclosure, in any manner, and for any length of time. For example, the components can be contacted by blending or mixing. Further, contacting of any component can occur in the presence or absence of any other component of the compositions described herein, unless otherwise stated or implied by the context of the disclosure. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to refer to materials which may be blended, mixed, slurried, dissolved, reacted, treated, or otherwise contacted in some other manner.

"Median pore diameter" (MPD) can be calculated, for example, based on volume, surface area or based on pore size distribution data. Median pore diameter calculated by volume means the pore diameter above which half of the total pore volume exists; median pore diameter calculated by surface area means that pore diameter above which half of the total pore surface area exists. And median pore diameter calculated based on pore size distribution means the pore diameter above which half of the pores have a larger diameter according to the pore size distribution determined as described elsewhere herein, for example, using mercury intrusion.

"Micropore" as used herein means pores present in catalysts or catalyst supports produced according to processes of the invention having a diameter of less than 200 Å.

"Mesopore" as used herein means pores present in catalysts or catalyst supports produced according to processes of the present invention having a diameter of 200 Å to less than 1000 Å.

"Micropore" as used herein means pores present in catalysts or catalyst supports produced according to processes of the present invention having a diameter equal to or greater than 1000 Å.

Each of the above definitions of micropore, mesopore and macropore are considered distinct such that there is no overlap and pores are not counted twice when summing up percentages or values in a distribution of pore sizes for any given sample.

"d50" means the median pore diameter as measured by mercury porosimetry. Thus it corresponds to the median pore diameter calculated based on pore size distribution and is the pore diameter above which half of the pores have a larger diameter. d50 values reported herein are based on nitrogen desorption using the well-known calculation method described by E. P. Barrett, L. G. Joyner and P. P. Halenda ("BJH"), "The Determination of Pore Volume and Area Distributions in Porous Substances. I. Computations from Nitrogen Isotherms," J. Am. Chem. Soc., 1951, 73 (1), pp 373-380.

"Total pore volume" as used herein means the cumulative volume in cc/g of all pores discernable by either nitrogen desorption or mercury penetration, also referred to as mercury intrusion (porosimetry) methods. For catalyst support or carrier particles and particularly for alumina powder, the pore diameter distribution and pore volume can be calculated with reference to nitrogen desorption isotherm (assuming cylindrical pores) by the B.E.T. (or BET) technique as described by S. Brunauer, P. Emmett, and E. Teller in the Journal of American Chemical Society, 60, pp 209-31.9 (1939); see also ASTM D 3037, which identifies the procedure for determining the surface area using the nitrogen BET method.

ASTM D4284-07, "A Standard Test Method for Determining Pore Volume Distribution of Catalysts by Mercury Intrusion Porosimetry" is an accepted test that is used to determine the volume distribution of pores in catalysts and catalyst carrier or support particles with respect to the apparent diameter of the entrances to pores. As discussed above, generally both the size and volume of pores in a catalyst affect its performance. Thus, the pore volume distribution is useful in understanding catalyst performance and may be one of the characteristics specified for a catalyst that can be expected to perform in a desired manner. The values for pore volume, including total pore volume or total intrusion volume, and various attributes of pore volume distribution, such as the percentage of pores in various size ranges, as well as pore mode, are based on the mercury intrusion method.

The pore diameter distribution can be calculated by means of the formula:

$$\text{pore diameter (in Angstroms)} = \frac{150{,}000}{\text{absolute mercury pressure (in bar)}}$$

and in accordance with the mercury penetration method (as described by H. L. Ritter and L. C. Drake in Industrial and Engineering Chemistry, Analytical Edition 17, 787 (1945)), using mercury pressures of 1-2000 bar. Mercury penetration is the technique of choice when the quantity of pores <60 Å in diameter is small as is the case, for example, in agglomerates.

The total N$_2$ pore volume of a sample is the sum of the nitrogen pore volumes as determined by the above described nitrogen desorption method. Similarly, the total mercury pore volume of a sample is the sum of the mercury pore volumes as determined by the mercury penetration method described above using, for example, a contact angle of 130°, a surface tension of 485 dynes/cm and a Hg density of 13.5335 gm/cc.

"Surface area" refers herein to the specific surface area determined by nitrogen adsorption using the BET technique as described above, whether in powder or agglomerate form.

All morphological properties involving weight, such as pore volume, PV (cc/g) or surface area, (SA) (m$^2$/g) can be normalized to a "metals free basis in accordance with procedures well-known in the art. However, the morphological properties reported herein are on an "as-measured" basis without correcting for metals content.

"Periodic Table": All references to the Periodic Table of the Elements herein refer to the Periodic Table of the Elements, published by the International Union of Pure and Applied Chemistry (IUPAC), published on-line at http://old.iupac.org/reports/periodic_table/; version dated 19 Feb. 2010.

The term "polymer" is used herein generically to include olefin homopolymers, copolymers, terpolymers, and so forth. A copolymer is derived from an olefin monomer and one olefin comonomer, while a terpolymer is derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as propylene, 1-butene, 1-hexene, or 1-octene. If the monomer and comonomer were ethylene and 1-hexene, respectively, the resulting polymer would be categorized an as ethylene/1-hexene copolymer. Additionally, the term "polymer" is used herein to apply to inorganic compositions relating to the preparation and formation of pillars in modified clay. For example, pillars are known to be formed in smectite clays based on the use of a polymeric cationic hydroxy metal complex, such as aluminum chlorohydroxide complexes (also known as "chlorhydrol"). Copolymers comprising such complexes are also disclosed. (See, for example, U.S. Pat. Nos. 4,176,090 and 4,248,739, D. E. W. Vaughan et al.) Furthermore, unless otherwise expressly stated, the term polymer is not limited by molecular weight and therefore encompasses both lower molecular weight polymers, sometimes referred to as oligomers, as well as higher molecular weight polymers. The relative terms "lower" and "higher" or "low" and "high" are generally understood by those skilled in the art and in the context in which the terms are applied.

In like manner, the scope of the term "polymerization" includes homopolymerization, copolymerization, terpolymerization, etc. Therefore, a copolymerization process would involve contacting one olefin monomer (e.g., ethylene) and one olefin comonomer (e.g., 1-hexene) to produce a copolymer.

The term "procatalyst" as used herein means a compound that is capable of polymerizing, oligomerizing or hydrogenating olefins when activated by an aluminoxane, borane, borate or other acidic activator (i.e., a Lewis or Bronsted acid), or when activated by a support-activator as disclosed herein, such compound being further defined according to the formula: $M(G)_n$; wherein M is a transition metal from Groups 3-10 of the Periodic Table, G may be the same or different and is hydrogen or an atom or functional group which binds to M through at least one atom in Groups 13-17 of the Periodic Table, and n=1 to 20.

"Rare earth" elements: The rare earth elements are understood to be made up of two series of elements, the lanthanide series (or group) and actinide series (or group). For purposes of the present invention, a reference to rare earth elements means only those elements of the lanthanide series or group and thus a reference in the present disclosure to a rare earth element will be understood to mean an element of the lanthanide series or group and vice versa, specifically one or more of the elements: lanthanum, cerium, praseodymium, neodymium, promethium, samarium, europium, gadolinium, terbium, dysprosium, holmium, erbium, thulium, ytterbium, and lutetium.

"Substantially": Unless otherwise defined with respect to a specific property, characteristic or variable, the term "substantially" as applied to any criteria, such as a property, characteristic or variable, means to meet the stated criteria in such measure such that one skilled in the art would understand that the benefit to be achieved, or the condition or property value desired is met. For example, see below for use of the term "substantially" in connection with a description of a metallocene catalyst or catalyst system in the substantial absence of an aluminoxane or borate activator. Alternatively, the phrase "substantially free of" with respect to, for example, an aluminoxane or borate activator is used to convey the same concept, condition or result. In other words, the term "substantially" serves reasonably to describe the subject matter so that its scope will be understood by persons skilled in the field of the invention, and to distinguish the claimed subject matter from prior art.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

Applicants disclose several types of ranges in the present invention. These include, but are not limited to, a range of number of atoms, a range of basal $d_{100}$ spacings, a range of weight ratios, a range of molar ratios, a range of temperatures, and so forth. When Applicants disclose or claim a range of any type, Applicants' intent is to disclose or claim individually each possible number that such a range could reasonably encompass, including end points of the range as well as any sub-ranges and combinations of sub-ranges encompassed therein. For example, when the Applicants disclose or claim a chemical moiety having a certain number of carbon atoms, Applicants' intent is to disclose or claim individually every possible number that such a range could encompass, consistent with the disclosure herein. For example, the disclosure that a moiety is a $C_1$ to $C_{12}$ alkyl group, or in alternative language having from 1 to 12 carbon atoms, as used herein, refers to a moiety that can be selected independently from an alkyl group having 1, 2, 3, 4, 5, 6, 7, 8, 9, 10, 11, or 12 carbon atoms, as well as any range between these two numbers (for example, a $C_1$ to $C_6$ alkyl group), and also including any combination of ranges between these two numbers (for example, a $C_2$ to $C_4$ and $C_6$ to $C_8$ alkyl group).

For any particular compound disclosed herein, any general or specific structure presented also encompasses all conformational isomers, regioisomers, and stereoisomers that may arise from a particular set of substituents, unless stated otherwise. Similarly, unless stated otherwise, the general or specific structure also encompasses all enantiomers, diastereomers, and other optical isomers whether in enantiomeric or racemic forms, as well as mixtures of stereoisomers, as would be recognized by a skilled artisan.

Preparation of Pillared or Intercalated Clay

The invention is based upon preparing porous materials by interlayering expandable, colloidal clay minerals with oligomeric molecules derived from trivalent rare earth salts and the hydrolysis of polyvalent cations such as $Al^{+3}$. The preparation of suitable pillared or intercalated clays for use in various embodiments of the present invention is described in comprehensive detail in U.S. Pat. No. 5,202,295 (J. R. McCauley, one of the inventors herein), incorporated in full herein or to the extent permitted according to law. As also described therein and further hereinbelow, other preparation methods, other pillaring metals and rare earth salts having other oxidation states can be used. The intercalated clay is ion-exchanged in order to obtain a suitable active support or substrate for use with a metallocene in order to form a polymerization-active catalyst or catalyst system when used in combination with a suitable aluminum cocatalyst.

The forms of smectite clays with pillars based upon aluminum-oxygen (just aluminum and oxygen) derivatives can exhibit $d_{001}$ spacings of 18 Å. Pillared clays herein can have pore and/or pillar heights generally of greater than about 20 Å to about 40 Å, 50 Å, 60 Å, or more. (Different clays and pillars can also produce different pore sizes.) A pore height greater than about 21 Å may be desired in some circumstances, and interlayer spacings of about 20 Å to 60 Å or 22 Å to 40 Å can be provided and find utility when large pores or channels are needed. Pore heights typically secured with montmorillonite are about 18 Å (which can be particularly useful). As montmorillonite pillared with aluminum-oxygen oligomers has a pore height (that is, interlayer distance) of about 8.5 Å, the inclusion of a rare earth element with the aluminum and oxygen in a pillar more than doubles the expansion over the Al—O pillared clay.

One embodiment of the invention may be characterized as an intercalated smectite clay having pillars comprising at least one rare earth or lanthanide group metal and also characterized by an interlayer spacing equal to or greater than about 18.5 angstroms; alternatively equal to or greater than 18.5 angstroms and equal to or less than about 100 angstroms.

Other embodiments of the invention may be characterized as: (a) an intercalated smectite clay; or (b) a catalyst support-activator; or (c) a process for making a catalyst support-activator; or (d) an olefin polymerization catalyst composition; or (e) a process to produce an olefin polymerization catalyst composition; or (f) an olefin polymerization catalyst composition; or (g) a process for polymerizing at least one olefin; or (h) an olefin polymer polymerized in a process using an olefin polymerization catalyst; wherein in each of (a)-(h) the intercalated smectite clay comprises pillars which comprise at least one rare earth or lanthanide group metal, said clay characterized by a basal $d_{001}$ spacing equal to about 18.5, 19, 20, 21, 22, 23, 24, 25, 26, 27, 28, 29, 30, 31, 32, 33, 34, 35, 36, 37, 38, 39, 40 or furthermore increasing by one, in other words, 41, 42, etc., up to about 100 angstroms; alternatively, such basal $d_{001}$ spacing is in a range represented by any of the lesser and greater values in the series just recited, for example, about 19 to about 80 angstroms; about 20 to about 60 angstroms; about 21 to about 70 angstroms; about 21 to about 58 angstroms; about 22 to about 50 angstroms, and the like.

Yet another embodiment of the invention may be characterized as an intercalated clay having pillars comprising a rare earth or lanthanide group metal, the pillar and/or clay comprising at least one ion-exchanged metal selected from the group consisting of aluminum, antimony, arsenic, barium, beryllium, calcium, cerium, cesium, copper, chromium, gadolinium, germanium, hafnium, holmium, iron (II and III), lanthanum, lithium, magnesium, manganese, neodymium, osmium, potassium, praseodymium, rubidium, samarium, silver, selenium, sodium, strontium, tellurium, terbium, thallium, tin, titanium, ytterbium, yttrium, zinc, and zirconium, and also characterized by an interlayer spacing, namely basal $d_{001}$ spacing, equal to or greater than about 18.5 angstroms; alternatively, equal to or greater than about 18.5 angstroms and equal to or less than about 100 angstroms. Alternatively, such spacing corresponds to the spacing recited in the paragraph immediately above, including any of the individual values and ranges.

Clays useful in the invention are crystalline, expandable, colloidal clays or clay minerals, and have ion exchange capacity. The clays should be of the three-layer type, namely, sheet structures composed of two layers of silica tetrahedrons and one central alumina dioctahedral or trioctahedral layer. This type of clay includes equidimensional expanding lattice forms (e.g., the montmorillonite groups, such as, montmorillonite and sauconite) and the elongate expanding lattice forms (e.g., the montmorillonite groups, such as nontronite, saponite and hectorite). The useful clays can be of natural or synthetic forms. Vermiculite is believed not to be useful in the invention.

The invention is especially useful with clays which are swellable clays generally known as smectites. The unit layer of smectite, such as, montmorillonite, is composed of two silica tetrahedral sheets and a central alumina octahedral sheet; a clay of this type is termed a 2:1 layered clay. The simplified formula, without considering lattice substitutions, is $Si_8Al_4O_{20}(OH)_4.nH_2O$, wherein n is usually a whole number. In reality, however, there are isomorphic substitutions within the lattice, e.g., replacement of aluminum by magnesium or iron, and in particular, substitution of silicon by aluminum. This leads to a net negative charge on the smectite layers which is compensated for by exchangeable cations situated between the unit layers.

In another embodiment the intercalated clays can contain different catalytic combinations and/or ions which have been incorporated inside of the interlamellar space thereof. Or in other words, catalytic activity can be provided in such interlamellar space by incorporating essential components consisting of different catalytically active metals, metal compounds or derivatives or combinations thereof, such as metallocenes and aluminum-containing metallocene cocatalysts and other metals as will be described hereinafter, in such interlamellar space. Such catalysts possess surprisingly high olefin polymerization activity particularly since such activity is observed in the absence of aluminoxane or borate compounds. The lateral pore size of the pillared clay can range generally from about 11 to about 35 by varying the amount of oligomer and clay in the preparation of the intercalated clay.

In one embodiment, stable intercalated clay is prepared by reacting a 2:1 layered clay with an oligomer prepared by copolymerizing soluble rare earth salts with a cationic metal complex of aluminum. The preferred 2:1 layered clays have a layer charge, x, of about 0.5 to 1. In contrast, vermiculite has a layer charge, x, of about 1 to 1.5. Also, vermiculite is not a colloidal clay. Preferably the clay is added to a solution of the oligomer. In another embodiment, pillared clay is prepared using ACH in combination with a smectite clay.

Although not wishing to be bound by theory, it is believed that, for example, if cerium cations are complexed or reacted with aluminum chlorhydroxide (ACH), or, more broadly, with Al cations which have been hydrolyzed, the cerium will be incorporated into the structure of the oligomer. It is believed that this has a stabilizing effect, perhaps by preventing cation migration through obstruction.

Pillared clay formed according to embodiments of the invention utilize polymeric cationic hydroxo inorganic metal complexes, polymers or copolymers in the preparation of the resulting oligomers or polymers, that is, preferably or alternatively in conjunction with one or more soluble rare earth salt. The preferred polymeric cationic hydroxo inorganic metal complexes are basic aluminum complexes formed by the hydrolysis of aluminum salts, basic zirconium complexes formed by the hydrolysis of zirconium salts, and basic chromium complexes formed by the hydrolysis of chromium salts. The most preferred polymeric cationic hydroxo inorganic metal complexes are the basic aluminum complexes, and the most preferred basic aluminum complex is aluminum chlorhydrol, sometimes referred to simply as chlorhydrol or as ACH.

Aluminum chlorhydrol solution used in the practice of the present invention is available from commercial sources and is typically represented by the formula $Al_2(OH)_5Cl \cdot (H_2O)_2$. Aluminum chlorhydrol solutions are also frequently referred to in the art as polymeric cationic hydroxy aluminum complexes or aluminum chlorhydroxides which are polymers formed from a monomeric precursor having the general formula $Al_2(OH)_5Cl \cdot (H_2O)_n$, wherein n=0 to 10. Preparation of aluminum chlorhydrol solution is disclosed in U.S. Pat. Nos. 2,196,016 and 4,176,090. Typically, preparation of aluminum chlorhydrol involves reacting aluminum metal and hydrochloric acid in amounts which produce a composition having the formula indicated above. Furthermore, the aluminum chlorhydrol may be obtained using various sources of aluminum such as alumina ($Al_2O_3$), clay and/or mixtures of alumina and/or clay with aluminum metal. Typically, aqueous aluminum chlorhydrol solutions used in the practice of the present invention have a content of from about 15 to 30 percent by weight $Al_2O_3$, although significantly more dilute concentrations can suitably be used, particularly if the other reaction conditions, including time and temperature, are appropriately adjusted. Alternative concentrations, expressed as wt % $Al_2O_3$ include, for example, 0.1 to 30; 0.5 to 30; 1.0 to 29; 2 to 28; 3 to 27; 4 to 26; 5 to 25; and including each individual concentration expressed in tenths between 0.1 to 30 wt %, and each range consisting of lower and higher value, in tenths, selected from the range of 0.1 to 30, such as 10.1 to 26.5.

In a preferred method for preparing pillared clays, aluminum chlorhydrol 24% $Al_2O_3$ (available commercially) is mixed with or contacted with lanthanum chloride such that Al/La=25. Alternatively, in other preferred embodiments, cerium(III) chloride or cerium nitrate is used. This solution can then be placed in, for example, a Teflon Parr bomb at elevated temperature, e.g., 130° C. for an extended period of time, typically one or more days, e.g., for 4 days. Variations of this procedure include adjusting the pH of the solution or adding other ionic species to produce different types of oligomers.

The desired alumina containing rare earth oligomer can be formed between the temperatures of 90° C. and 150° C. (over 104° C. under pressure) for 1 to 40 days, with 130° C. for 4 days being one preferred condition. When a rare earth salt is used, the molar ratio of alumina to rare earth is typically between 1 and 100 with 25 being preferred. The concentration of the reactants can vary between 24% (saturated) to 2.4% $Al_2O_3$ with 24% being preferred.

The type of rare earth used for formation of the oligomer can have a pronounced effect on the resulting clay and/or pillar structure. The crystallinity of the oligomer (see FIGS. 23-26 of U.S. Pat. No. 5,202,295) decreases from lanthanum (most crystalline) to neodymium (least crystalline).

In addition, cations (e.g., iron, nickel, silicon, and magnesium) can make isomorphic substitutions for aluminum thereby altering the characteristics of the oligomer. The extent of replacement is determined by equilibria. However, substitution for aluminum is thermodynamically favored by elements of similar size and charge. Other cations such as lithium can also alter the structure depending on their concentrations. Also, anions (such as phosphate, fluoride, hydroxide, and carbonate) can displace chloride from the oligomer's structure thereby altering its structure. Pillared clay resulting from altered oligomers can exhibit different chemical and physical properties than pillared clay containing unaltered oligomers. Small quantities of fluoride (Al/F=1000) in the oligomer can result in pillared clay with different acidity and binding properties.

In an alternative embodiment, the aluminum portion of the reactant solution could be substituted in all or part by zirconium, chromium, and titanium since these elements are also known to form large polymeric species.

It is theorized that since aluminum cations species are in equilibrium with each other as a function of pH, concentration, and temperature it is expected that structures not yet found exist. Any cation that exists at the concentrations and pH range of the ACH or alumina-rare earth oligomer and capable of making isomorphic substitutions for aluminum could be copolymerized and incorporated into that oligomer's structure. A preferred composition of the oligomer comprises aluminum, rare earth, oxygen, and/or a halogen.

Aluminum, zirconium and chromium complexes can be used alone or in combinations. Additionally, any cation, anion or colloidal material that can exist at the concentrations and pH of the salt (e.g., aluminum, zirconium or chromium) that forms an oligomer can be copolymerized and incorporated into the structure of the oligomer. Without wishing to be bound by theory, it is believed that a stabilized system is formed provided the species obstructs or inhibits cation migration.

A suitable class of inorganic aluminum complexes or polymers is those having the general formula $Al_{2+n}(OH)_{3n}X_6$, wherein n has a value of about 4 to 12, and X is usually Cl, Br and/or $NO_3$. These inorganic metal polymers are generally believed to have an average molecular weight on the order of from about 2000 and larger. The preferred inorganic aluminum complex is aluminum chlorhydroxide.

A suitable class of the zirconium complexes used to prepare pillared interlayed clay products has the following general formula: $[Zr_4(OH)_{12}(H_2O)_{12}]^{+4}$. Aqueous solutions of zirconyl chloride, $ZrOCl_2$ contain tetrameric hydroxo complexes of the type $[Zr_4(OH)_{16-n8}]^{n+}$, the charge per Zr atom being n/4.

Preparation of the aluminum, zirconium and chromium complexes and polymers is generally known to those skilled in the art and is disclosed in, for example, U.S. Pat. No. 5,202,295, from which the following is adapted.

In the preparation of intercalated clays herein, the clay is preferably added to a solution of the oligomer. Slurries, suspensions, dispersions and the like of the clay can also be used.

The hydrolysis-polymerization can be conducted in the presence of a base or acid which changes the pH of the reaction mixture to a pH range preferably of 2.9 to 4.0 for aluminum polymers. The pH of the starting solution goes to 3.1; one can start at pH 4 and it goes to 3.1; a starting pH of below 3.1 also goes to 3.1, but the pH shift takes longer. The further away the starting pH is from 3.1, the longer the time necessary for the formation of the oligomer. Bases, such as, ammonium hydroxide and sodium hydroxide or a base forming reactant such as magnesium metal, are added to a heated solution of the metal complex in amounts ranging from about 0.5 to 3 equivalents of base per equivalent of complex. Where the hydrolysis polymerization reaction is conducted in the presence of a base, the solutions are usually reacted at a temperature of from about 50° to 100° C. for a period of from about 0.1 to 24 hours.

In an further embodiment, high molecular weight polymers can be prepared by copolymerizing an aluminum, zirconium, chromium or other pillaring metal complex with a copolymerizing reactant, such as, $SiO_3^{-2}$, $ZrO_2^{+2}$ or $BO_3^+{}_3$, which can be included in the reaction mixture as sodium silicate, $ZrOCl_2$, $MgCl_3$, zirconium chloride, boric acid or sodium borate, for example. The reactions are conducted in aqueous solutions which contain up to 50 percent by weight of solids and are conducted at temperatures on the order of 80° to 190° C. for periods of 1 hour to 100 hours. The temperature used is time dependent so the balance of an effective temperature for a suitable time should be used. The surface area of the resultant intercalated clay depends upon the solids content in the reaction solution. For example: a surface area of about 250 $m^2$/g results from a solids content of 40 weight percent; a surface area of about 300 $m^2$/g results from a solids content of 35 weight percent; and a surface area of about 400 $m^2$/g results from a solids content of 25 weight percent.

As is further disclosed, the above-described methods of preparing aluminum, zirconium, chromium and other metal complexes can be modified to include the use of at least one rare earth salt therein and is thereafter further modified according to an ion-exchange step, described below.

Any suitable soluble rare earth salt can be used, although water soluble rare earth salts are preferred. A preferred water soluble rare earth salt is $LaCl_3$. A preferred class of water soluble rare earth salts is the water soluble cerium salts; another preferred class is the water soluble lanthanum salts. The most preferred soluble rare earth salt is $LaCl_3$, and $CeCl_3$ is the next preferred. But it must be noted that in nature the rare earths usually occur in mixed form (with Ce being most plentiful and La next plentiful in such mixtures) and are expensive to separate, so in a commercial setting, mixtures of rare earth salts would most likely be used and would be suitable. Accordingly, mixtures of rare earth salts are particularly preferred from a commercial viewpoint.

The rare earths are the metallic oxides of the rare earth elements (or rare earth metals). The rare earth elements include the lanthanum series, that is, elements with atomic numbers 57 through 71. (The rare earth elements are chiefly trivalent.) The lanthanum series includes La, Ce, Pr, Nd, Pm, Sm, Eu, Gd, Tb, Dy, Ho, Er, Tm, Yb and Lu.

The preferred rare earth salts are those wherein the rare earth atom(s) are trivalent (i.e., the +3 oxidation state). Rare earth salts having rare earth elements of other oxidation states may also be useful.

Examples of suitable soluble rare earth nitrates include $La(NO_3)_3$, $Ce(NO_3)_3$, $Nd(NO_3)_3$, $Sm(NO_3)_3$, $Eu(NO_3)_3$, $Gd(NO_3)_3$, $Tb(NO_3)_3$, $Dy(NO_3)_3$, $Er(NO_3)_3$, $Tm(NO_3)_3$, $Yb(NO_3)_3$, $Y(NO_3)_3$, $Sc(NO_3)_3$, $Y(NO_3)_3$ and $Sc(NO_3)_3$. Examples of suitable soluble rare earth halides include the chlorides, bromides, iodides and fluorides, such as $LaBr_3$, $LaCl_3$, $LaI_3$, $CeBr_3$, $CeCl_3$, $CeF_3$, $PrCl_3$, $PrI_3$, $NdBr_3$, $NdCl_3$, $NdI_3$, $SmCl_3$, $EuBr_3$, $EuI_3$, $GdBr_3$, $GdCl_3$, $GdI_3$, $TbBr_3$, $TbCl_3$, $TbI_3$, $DyI_3$, $DyCl_3$, $HoI_3$, $HoCl_3$, $ErI_3$, $ErBr_3$, $TmI_3$, $TmCl_3$, $TmBr_3$, $YbBr_3$, $YbCl_3$, $YbI_3$, $LuBr_3$, $LuI_3$, $LuCl_3$, $YCl_3$, $YI_3$, $YBr_3$ and $ScCl_3$. Examples of suitable soluble rare earth sulfates include $La_2(SO_4)_3$, $Ce_2(SO_4)_3$, $Pr_2(SO_4)_3$, $Nd_2(SO_4)_3$, $Sm_2(SO_4)_3$, $Eu(SO_4)_3$, $Gd_2(SO_4)_3$, $Tb_2(SO_4)_3$, $Dy_2(SO_4)_3$, $Er_2(SO_4)_3$, $Yb_2(SO_4)_3$, $Y_2(SO_4)_3$, $Tb_2(SO_4)_3$, $Dy_2(SO_4)_3$. Examples of suitable soluble rare earth selenates include $Ce_2(SeO_4)_3$, $Pr_2(SeO_4)_3$, $Gd_2(SeO_4)_3$ and $Dy_2(SeO_4)_3$. Examples of other suitable soluble rare earth salts include cerium oxalate, cerium(III) acetate, praseodymium acetate, neodymium acetate, samarium acetate, samarium bromate, dysprosium bromate, dysprosium acetate, yttrium acetate, yttrium bromate, and ytterbium acetate. The rare earth nitrates and chlorides are preferred because they are the most soluble of the rare earth salts in water. The rare earth salt preferably has at least a solubility constant, $K_{sp}$, which allows it to go into solution sufficiently to allow fast oligomer formation.

In alternative embodiments, hydrated forms of $Met_mX_n$ salts and compounds, to the extent that they are available, are also useful.

To provide methods of producing supported catalysts comprising large pores suitable for use in preparing such catalysts, stabilization of the pillars from thermal degradation is preferred and incorporation of rare earths into the structure of the inorganic polymers or oligomers can provide stabilization of the pillars from thermal degradation.

The synthesis of the oligomer is preferably conducted in water. Alternatively, synthesis can be conducted in a non-aqueous organic or inorganic solvent. Examples of useful non-aqueous solvents are acetone (preferred), benzene, toluene, cyclohexane, hexamethylsiloxane, ethyl ether, alcohols, such as methyl, ethyl, propyl and benzyl alcohol, ketones, organic acids, their anhydrides or esters, ketones, toluene, nitrobenzene, pyridine, ethylene glycol, dimethyl ether, tetrahydrofuran, acetonitrile and methyl isobutyl ketone. Preferably the non-aqueous solvent is a strongly polar solvent. The solvent should be inert. Mixtures of solvents can be used, in that one solvent can be used for the rare earth salt and another solvent for the metal complex—when different solvents are used, both solvents should be compatible or miscible.

The pillar forming aspect of the invention uses at least one pillaring metal which in conjunction with at least one rare earth provides hydrothermal stability and a $d_{001}$ value of at least 19.6 Å, preferably at least 25 Å and more preferably at least 30 Å. This means that the pillaring metal forms large polymeric cationic hydroxo inorganic metal complexes. Aluminum is preferred because it provides such large complexes having up to 13 aluminum atoms. Chromium and zirconium also provide suitable, but relatively smaller, complexes. Ti, Mg, As, Sb, Co, Mn and/or Zn, for example, can be used in conjunction with the Al, Cr, and Zr and/or other pillaring metals. Pillaring metals must form metal moieties which hydrolyze and form complexes. Aluminum chlorhydroxide and a soluble rare earth salt can provide a $d_{001}$ value of, for example, 27.4 Å, which significantly increases the pore opening or pillar height compared to the use of aluminum chlorhydroxide by itself. It is observed that the pillared clay is particularly stable, such that when aluminum complexes are used, even after steaming (100 percent) at 1400° F. for 5 hours, surface areas of about 400 $m^2$/cm. remain and the 27.4 Å pore size is observed to exhibit a unique intensity.

The observation of temperature effects on the $d_{001}$ spacing is a convenient way to investigate the thermal stability and hydrothermal stability of an interlayered clay. Bragg's equation (or law) as applied in pillared clays is:

$$n\lambda = 2d \cdot \sin\theta$$

wherein n is the repeat number, λ is 1.5418, d is $d_{001}$ and θ is the angle of incidence.

Cationic oligomers, as indicated above, form at a pH of about 3.1. Copolymerization and hydrolysis can occur at a pH of up to about 8. These pH values hold for aluminum-rare earth element-oxygen oligomers.

Generally, low Cl levels in the oligomers are desired and thus Cl is typically removed by washing to as low levels as possible or practical; in other words, chloride ion is substantially absent.

The clays or lamellar materials which can be utilized as starting materials for preparing pillared clay are those colloidal lattice clay minerals and their colloidal synthetic analogues which are capable of swelling. A suitable natural swellable clay is montmorillonite; the suitable synthetic swellable clays are certain fluorhectorites or fluorohectorites (both referred to herein as fluorhectorites). Suitable clays include the expandable smectites, as well as synthetic forms thereof such as reduced charge montmorillonite. Methods of preparing synthetic clays are well-known in the art. Natural or synthetic swellable clays can be used.

The clay preferably has a particle size equal to or less than 2 microns.

The clays useful in the invention are crystalline, expandable, colloidal clays or clay minerals. The clays should be of the three-layer type, namely, sheet structures composed of two layers of silica tetrahedrons and one central dioctahedral or trioctahedral layer. This type of clay includes equidimensional expanding lattice forms (e.g., the montmorillonite groups, such as montmorillonite and sauconite) and the elongate expanding lattice forms (e.g., the montmorillonite groups, such as nontronite, saponite and hectorite). Vermiculite is not believed to be useful in the invention. As noted above, useful clays can be natural or synthetic forms.

Smectites are 2:1 layered clay minerals that carry a lattice charge and characteristically expand when solvated with water and alcohols, most notably ethylene glycol and glycerol, and are generally represented by the formula:

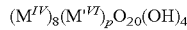

$(M^{IV})_8(M'^{VI})_pO_{20}(OH)_4$ wherein p equals four for cations with a +3 charge, equals 6 for cations with a +2 charge, IV indicates an ion coordinated to four other ions, and VI indicates an ion coordinated to six other ions. M is commonly $Si^{4+}$, optionally partially substituted by other ions such as $Al^{3+}$ and/or $Fe^{3+}$ as well as several other four coordinated ions such as $P^{5+}$, $B^{3+}$, $Ge^{4+}$, $Be^{2+}$ and the like. M' is commonly $Al^{3+}$ or $Mg^{2+}$, but also can be partially substituted with hexacoordinate ions, such as $Fe^{3+}$, $Fe^{2+}$, $Ni^{2+}$, $Co^{2+}$, $Li^{+}$ and the like. The charge deficiencies created by the various substitutions into these four and six coordinate cation positions are balanced by one or several cations located between the structural units. Water can also be coordinated to these structural units, bonded either to the structure itself, or to the cations as a hydration shell. When dehydrated, the above structural units have a repeat distance or interlayer spacing of about 9 to 12 Å, as measured by X-ray diffraction. Examples of suitable smectites include montmorillonite, bentonite, beidellite, hectorite, saponite, sauconite, nontronite, chlorite and analogues thereof. Both dioctahedral and trioctahedral smectites can be used.

The clays are usually in the alkali metal form, such as, sodium montmorillonite, with the sodium form being preferred. The clays can be in other metal forms, such as, Ca, other alkaline earth metals, Ce, Ni, Fe, Cr, Be, Ti, B, etc. For example, the montmorillonite used preferably has a high Na concentration rather than Ca because the former provides easier ion exchange and better layer expansion.

Swelling agents, that is, polar molecules, such as water, ethylene glycol and amines, substantially increase the distance between the interlamellar layers of clay by absorption of the swelling agent which enters the intermellar space and in doing so pushes apart the lamellar layers.

The preferred smectite clays have a layer charge, x, of about 0.5 to 1.

When a rare earth metal salt is used, the molar ratio of the rare earth metal, for example, cerium, to aluminum in the prepolymerized solution, measured as $CeO_2$:$Al_2O_3$, typically ranges from 1:52 to 1:1 without any apparent effect on the product. That is because only 1:52 is in the final pillars (i.e., the excess cerium being lost during washing). If the molar ratio is too high (e.g., 1:78) there is a negative effect on oligomer formation in that smaller pillars consisting of only Al and no rare earth metal, or $Al^{(3+)}$ monomer itself can compete with the desired rare earth containing pillar, affording lower basal spacing. The temperature for the reaction of a chlorhydrol solution at approximately 24 weight percent solids is preferably between 145° C. and reflux with satisfactory results (reflux, at about 106° C. is most preferred). The upper and lower temperature limits can generally range from about 5° to about 200° C. Within such a temperature range results can be observed within 24 hours. After 100 hours, results have been reported to be identical to those with reaction times over 1000 hours. After the clay has been intercalated, it can be aged up to 10 days or more without any degradation of the structure. However, if the oligomer is cooled to room temperature it should be reacted with the clay within one day to assure a good product (i.e., before the oligomer breaks down). The ratio of oligomer to clay can be varied resulting in different materials, i.e., partially or fully intercalated clay, with optimum stability reported using about 3 millimols of Al per gram of clay.

Generally, in preparing the intercalated clay, a solution of the oligomer is first prepared. The solution resulting from the preparation of the oligomer can be used. The clay can be added to the oligomer solution. Water or other inert liquid diluent can be used to prepare the oligomer solution. The clay preferably is added to the oligomer solution. Thorough mixing should be used. The concentrations in the mixture of the clay suspension and the oligomer solution used to form the pillars should be sufficiently high to result in the formation of pillars. The solvents disclosed above for the oligomer formation can be used as the liquid medium to prepare the clay solution, suspension or slurry, although water is preferred.

The clay concentration in the final mixture, that is to say, after mixing of the oligomer solution and the initial clay suspension, should be sufficiently high to obviate the handling of large volumes of mixture, yet not excessively high since too high a clay concentration in the mixture would make the latter difficult to handle. The clay concentration in the final mixture preferably ranges from 1 to 20 weight percent, for example.

In the preparation of intercalated clay, a 2:1 layered clay substrate is impregnated with the oligomer reactant which gives rise to a three-dimensional supporting structure (pillars) between the layers of the clay. Factors which can affect securing uniform pillaring include reaction time, reaction temperature, purity of the clay and clay particle size; these are easily determinable for each oligomer/clay system. When the clay is treated with the oligomer reactant, the oligomer diffuses between the layers of the clay and is bound to the layer by ionic bonds, such as through ion exchange with the native metal ions in the clay, or by physical absorption (e.g., of the Van der Waal's type or hydrogen bonding). The pillars serve to prop open the clay layers upon removal of water and form an internal interconnected microporous structure throughout the interlayer.

The temperature at which the clay is impregnated with the pillaring agent is not believed to be critical. Preferably, the temperature is about 106° C., although temperatures ranging from the freezing point to the boiling point of the solution containing the pillaring agent are reported to be satisfactory.

The clay substrate is contacted, exchanged or reacted with an amount of pillaring agent sufficient to give an intercalated structure. The amount of intercalated material within the layers should be an amount at least sufficient to maintain the spacing of the expanded clay, without being in so large an amount as to prevent a microporous system formation.

The pH of the solution containing the pillaring agent may have to be adjusted to provide for optimum intercalation, e.g., time of formation, which can be readily determined.

The intercalated clay slurry is preferably aged for at least 10 days at room temperature, but economics can be a significant factor as whether or not to age and for how long. Elevated temperatures, for example, 150° F., reduce the aging time period. The intercalated clay slurry can be, and preferably is washed to remove detrimental components, e.g., Cl⁻, etc., in other words compounds or ions that can interfere with or deactivate a catalyst component subsequently supported on the modified clay.

Alternatively, use of use of dilute concentrations of the pillaring composition may avoid the need to employ multiple wash steps or the need for washing at this point altogether. In other words, the level of residual, unreacted or by-product components or compositions or anions can be sufficiently low so that the intercalated clay slurry can be considered as "substantially free" of undesirable components or components that may interfere with acceptable functioning of a deposited, supported catalyst or catalyst components carried on the pillared clay.

Should it be preferred to wash the pillared clay, the solids-containing wet pillared clay phase is re-dispersed in fresh distilled or preferably de-ionized water and is washed. This process is repeated a sufficient number of times in order to provide pillared clay that is free or substantially free of residual anions or unconsumed, unincorporated or residual reactant(s). A satisfactory condition can be determined, for example, by measuring the conductivity of the supernatant liquid or water phase or, when chloride ion is present as an undesirable or detrimental component, by testing the water phase until a negative $AgNO_3$ result is obtained.

When conductivity of the supernatant liquid or water phase is used to confirm that the pillared, washed clay is free or substantially free of undesirable or detrimental anions, The conductivity of the supernatant is less than 20,000 μS/cm using, for example, a commercially available conductance meter such as offered by Radiometer Analytical and conducting the test according to the instruction manual and references provided with the test instrument. Preferably conductivity of the supernatant is from 10,000 μS/cm to 0.1 μS/cm; more preferably 1,000 μS/cm to 1 μS/cm; most preferably 500 μS/cm to 5 μS/cm; such as less than 500 μS/cm or less than 100 μS/cm or less than 50 μS/cm or less than 25 μS/cm, each to 1 μS/cm or 0.1 μS/cm. Alternatively the supernatant liquid from suitably pillared, washed clay can exhibit any single conductivity value between 10,000 and 0.1 μS/cm in 0.1 increments.

The pillared interlayered clay can thereafter be separated from the reaction medium by conventional means, such as, by centrifugation, air-drying, freeze-drying or filtration.

Heating and/or calcining step are used to remove the solvent and fix the structure of the expanded layer or pillared state of the clay. Such heating or calcining decomposes the hydrolyzed metal complexes to pillars of stable inorganic oxides.

Usually a calcination temperature of at least 110° C., for example 200° C. to 800° C. or higher can be used.

Upon calcination, the interlayered metal complex is decomposed or dehydroxylated to form "inorganic oxide pillars" between the expanded clay layers. The resulting pillared interlayered clay products possess a unique interconnected internal microporous structure. Calcining at elevated temperatures in air or steam also removes organic moieties in the clay. The temperature of stabilization is dependent upon the type of clay. Dehydroxylation temperature can be different for each type of clay.

After calcining, the pillars can be defined as discrete, non-continuous inorganic oxide particles.

U.S. Pat. No. 5,202,295 discloses a representative method for preparing the intercalated clays is as follows: 5 parts by weight of 50 percent aluminum chlorhydroxide is mixed with 1 part of 60 percent $Ce(NO_3)_3$. This solution is then placed in a Teflon Parr bomb at 130° C. for 100 hours. The contents are then poured into 1000 parts of $H_2O$ and, under high speed stirring, 7.5 parts of bentonite is added. The material is then usually filtered, redispersed with water for one or more additional times, and finally dried, calcined for example at 800° C. for 16 hours. Any suitable and useful treatment and purification steps can be used. The resultant intercalated clay is hydrothermally stable.

Smectite-type clays are capable of layer expansion to form pores. The pillars maintain the expanded layer state in the clay and leave porosity framed by the pillars and the expanded layers in smectite clays. The resultant pores have a rectangular type opening due to this framing by the pillars and clay layers. Thus, the pores have a different shape than other natural inorganic oxides, e.g., the zeolites, which are more circular in shape.

The intercalated clay preferably has a nitrogen BET surface area of about 300 to 600 m²/cm, although lower surface areas can be produced by using relative large amounts of clay compared to the oligomer.

Ion Exchanging of Pillared Clay

The pillared, interlayered clay is ion-exchanged and can be further contacted with metallocene compounds and aluminum-containing compounds in order to prepare polymerization catalysts. In preferred embodiments, ion exchange is carried out, for example, with aqueous solutions of magnesium or zinc chloride. Without wishing to be bound by theory, it is believed that the exchanged metal ions find their way into or on or become associated with the pillars or on the layers of the clay.

Ion exchange of the pillared clay can be carried out as follows. An aqueous solution of a metal salt such as zinc chloride or magnesium chloride is prepared and the pillared clay is contacted with or added to the solution, preferably with stirring. The composition is mixed or stirred for an extended period at moderately elevated temperature, for example, from 15 minutes to 24 hrs. at 30° C. to 95° C.; for example, 4 hours at 70° C. If desired, the pH of the starting metal salt solution can be adjusted. The ion-exchanged pillared clay product can be collected by filtration and washed with water, distilled water or preferably deionized water, several times to remove chloride ion, for example, until a negative chloride test is obtained using silver nitrate. The ion exchange procedure can be performed once or it can be repeated multiple times, for example, from 2 to 20 times, or from 2 to 15 times, or 2 to 10 times, such as 2, 3, 4, 5, 6, 7, 8, 9, 10 times or more, or a number of times comprising a range represented by any single low number and any single high number of the numbers just recited. After the desired number of ion exchange steps are carried out, the pillared, ion-exchanged clay can optionally be washed with deionized water in the absence of additional ion exchanging with the metal salt solution. Washing-only steps can be carried out multiple times, for example from once to as many as 20 times, or 1 to 15 times, or 1 to 10 times or 2-10 times or any number of times from 1 to 20 times. It has been observed that washing-only steps that follow metal salt ion exchange can have a beneficial effect on the modified clay when it is used as a metallocene catalyst support. Such combination of ion exchanging and/or washing-only can be conducted multiple times as described above. At the conclusion of ion exchanging and washing steps, the resulting product is dried and preferably calcined, as further described below. The calcined product can be used as a catalyst support or pulverized, and used as a catalyst support.

Suitable ion exchange conditions include: aqueous metal salt solutions typically having a concentration of about 0.0001 or about 0.001 molar (M) to about 10 molar (M), preferably about 0.01 M to about 10 M, more preferably about 0.1 M to about 1 M, most preferably about 0.1 M to about 0.5 M; at a temperature of about 0° C. to about 200° C., preferably about 20° C. to about 100° C., more preferably about 25° C. to about 50° C.; contact time of the agitated metal ion containing salt solution with the pillared clay about 10 min. to about 100 hrs., preferably about 30 min. to about 50 hrs., more preferably about 1 hr. to about 1 day, most preferably about 2 hrs. to about 8 hrs.; drying temperature following ion exchange is selected so as to provide a powder or solids that can be readily ground to form a powder, such as about 25° C. to about 200° C., preferably about 50° C. to about 100° C., more preferably about 60° C. to about 80° C.; alternatively, the ion exchanged composition can be spray dried.

As described above, clay that has been modified so as to comprise a pillar, such as an ACH pillar or preferably a pillar further comprising at least one rare-earth metal is ion-exchanged at a temperature and for a period of time with at least one water-soluble metal salt, identified as $Met_mX_n$.

In alternative embodiments $Met_m$ can be selected from the group consisting of: aluminum, antimony, arsenic, barium, beryllium, calcium, cerium, cesium, copper, chromium, gadolinium, germanium, holmium, iron (II and III), lanthanum, lithium, magnesium, manganese, neodymium, osmium, potassium, praseodymium, rubidium, samarium, silver, selenium, sodium, strontium, tellurium, terbium, thallium, thorium, tin, uranium, ytterbium, yttrium, zinc and mixtures thereof.

In further alternative embodiments, $X_n$ comprises at least one anionic species independently selected from the group consisting of a halide selected from the group consisting of chloride, iodide, fluoride and bromide; bromate; chlorate; perchlorate; sulfate; sulfamate; carbonate; hydrogen-carbonate; carbamate; nitrite; nitrate; oxalate; phosphate; selenate; sulfamate; azide; alkoxide; amide, including $NR_2$ or $R[CON(R)]_a$, wherein R is independently H or a $C_1$-$C_{20}$ unsubstituted or substituted hydrocarbyl group and a=1-4; and carboxylate, including $R[CO_2]_b$, wherein R is independently H or a $C_1$-$C_{20}$ unsubstituted or substituted hydrocarbyl group and b=1-4.

Specific alternative metal salt embodiments include $MgF_2$, $MgCl_2$, LiCl, $Mg(OAc)_2$, $Mg(NO_3)_2$, $ZnCl_2$, NaCl, CsCl, $ZnSO_4$, KCl, $CaCl_2$, RbCl, LiCl, $CuCl_2$, $CuSO_4$, $FeCl_3$, and $CoCl_2$.

In particularly preferred embodiments, zinc or magnesium salt solutions are ion exchanged with rare-earth containing pillared clay; including, for example, salt solutions selected from the group consisting of zinc halide, magnesium halide, and mixtures thereof; such as zinc chloride, magnesium chloride and mixtures of zinc chloride and magnesium chloride.

In an embodiment, a metal salt $Met_mX_n$ selected from among those disclosed above is dissolved in water, preferably distilled or deionized water, and the solution is contacted with pillared clay that is prepared according to the methods disclosed herein. Contacting can take the form of simple mixing of $Met_mX_n$ solution with solid or powdered pillared clay or such clay dispersed in a fluid such as water, using an appropriate stirrer or paddle. Alternatively, contacting can be accomplished using motionless mixers, shakers, ultrasonic mixers and the like. In an embodiment, pillared clay is added to the $Met_mX_n$ solution; in an alternative embodiment, $Met_mX_n$ solution is added to pillared clay.

Concentration of the $Met_mX_n$ can vary from 10 molar (M) to 0.0001 molar (M), including the end-points as well as intermediate values and ranges; alternatively, from 1 M to 0.001 M; such as from 0.1 M to 0.01 M.

The relative concentration of clay and $Met_mX_n$ can be expressed as grams clay per mL of solution, and can range from 15 to 45; or from 5 to 45; or from 0.1 to 45; such as from 3 to 45; including the end points as well as intermediate values and ranges.

Rare earth or lanthanide metal pillared clay is ion exchanged or contacted with $Met_mX_n$ solution at a temperature of 150° C. to 5° C., including the end-points as well as intermediate values and ranges; or 100° C. to 10° C.; alternatively 50° C. to 20° C.; such as 25° C. to 22° C.

Contact time at the selected temperature between the pillared clay and $Met_mX_n$ can vary from 30 sec. to 48 hr., including the end-points as well as intermediate values and ranges; alternatively, from 15 min. to 24 hr.; or from 30 min. to 12 hr.; or from 45 min. to 8 hr.; such as from 1 hr. to 6 hr.

Following mixing, the resulting ion-exchanged clay slurry or suspension is separated into a solids-containing phase and a supernatant, liquid phase such as with the use of a centrifuge. The intercalated, ion-exchanged clay slurry can be, and preferably is washed to remove detrimental components, e.g., Cl⁻ or other anions, etc., in other words compounds or ions that can interfere with or deactivate a catalyst component subsequently supported on the modified clay.

Alternatively, use of use of dilute concentrations of the $Met_mX_n$ ion-exchange composition may avoid the need to employ multiple wash steps or the need for washing at this point altogether. In other words, the level of residual, unreacted or by-product components or compositions or anions can be sufficiently low so that the intercalated clay slurry can be considered as "substantially free" of undesirable components or components that may interfere with acceptable functioning of a deposited, supported catalyst or catalyst components carried on the pillared clay.

As described above for preparation of the pillared clay, should it be preferred to wash the pillared, ion-exchanged clay the solids-containing phase is re-dispersed in fresh de-ionized (preferably) or distilled water several times until the supernatant liquid phase is free or substantially free of the anion of the metal salt, e.g., Cl⁻ ions as tested according to the standard AgNO$_3$ test or according to a conductance test also as described in detail above and pursuant to obtaining a satisfactory conductivity (μS/cm) result according to the ranges and values as recited above.

The ion-exchanged, pillared clay can be repeatedly ion-exchanged as described above, preferably using the same Met$_m$X$_n$ salt and repeatedly washed to remove residual X$_n$. Significantly, the pillared and ion-exchanged clay is air dried and/or calcined; it is preferably calcined. Generally, calcining is conducted in an ambient atmosphere, preferably a dry ambient atmosphere, at a temperature in the range of at least 110° C., for example about 200° C. to about 800° C., and for a time in the range of about 1 minute to about 100 hours. Preferably, the ion-exchanged, pillared clay is calcined at temperatures from about 225° C. to about 700° C. and a time in a range of about 1 hour to about 10 hours, most preferably, temperatures from about 250° C. to about 500° C. and a time in a range of about 1 hour to about 10 hours. Alternatively, calcining is accomplished in air at a temperature of 200° C. to 750° C.; or 225° C. to 700° C.; or 250° C. to 650° C.; or 225° C. to 600° C.; or 250° C. to 500° C.; alternatively 225° C. to 450° C.; such as 200° C. to 400° C. As indicated, a calcining temperature selected from any single temperature or range of two temperatures separated by at least 10° C. in the range of 110° C. to 800° C. can be used.

The modified, calcined clay can be used as a substrate or catalyst support-activator for purposes of introducing one or more suitable polymerization catalyst precursors, organometal compounds, and/or organoaluminum compounds or catalyst components in order to prepare a polymerization catalyst composition. The modified, calcined clay exhibits catalyst activating properties when used in combination with, for example, metallocene or single-site or coordination catalyst components useful for polymerizing monomers, especially olefinic monomers. The support-activator is particularly advantageous in that when it is used as a support for organometal compounds in combination with organoaluminum compounds, the resulting composition exhibits catalytic polymerization activity in the absence or substantial absence of aluminoxanes and organoborates, the latter two compounds ordinarily thought of as necessary in order to achieve polymerization catalytic activity with metallocene or single site or coordination catalyst systems.

Thus, a further embodiment comprises at least one metal selected from the group consisting of catalytically active transition metals of Groups 3-10 of the Periodic Table, optionally including at least one organoaluminum compound, deposited on a pillared, ion-exchanged, calcined support as described herein.

Procatalysts or organometal compounds are useful herein, wherein organometal compounds are denoted by the following general formula (I):

(I)

In Formula (I), M$^1$ is selected from the group consisting of titanium, zirconium, hafnium, and mixtures thereof; it is preferred when M$^1$ is zirconium. Furthermore, in Formula (I), (X$^1$) is independently selected from the group consisting of (hereafter "Group OMC-I") cyclopentadienyl, indenyl, fluorenyl, substituted cyclopentadienyl, substituted indenyl, such as, for example, tetrahydroindenyl, and substituted fluorenyl, such as, for example, octahydrofluorenyl.

Substituents on the substituted cyclopentadienyl, substituted indenyl, and substituted fluorenyl of (X$^1$) can be selected independently from the group consisting of aliphatic groups, cyclic groups, combinations of aliphatic and cyclic groups, silyl groups, alkyl halide groups, halides, organometallic groups, phosphorus groups, nitrogen groups, silicon, phosphorus, boron, germanium, hydrogen, and mixtures thereof, provided that these groups do not substantially, and adversely, affect the polymerization activity of the catalyst composition.

Suitable examples of aliphatic groups are hydrocarbyl groups such as, for example, paraffins and olefins. Suitable examples of cyclic groups are cycloparaffins, cycloolefins, cycloacetylenes, and arenes. Substituted silyl groups include, but are not limited to, alkylsilyl groups where each alkyl group contains from 1 to about 12 carbon atoms, arylsilyl groups, and arylalkylsilyl groups. Suitable alkyl halide groups have alkyl groups with 1 to about 12 carbon atoms. Suitable organometallic groups include, but are not limited to, substituted silyl derivatives, substituted tin groups, substituted germanium groups, and substituted boron groups.

Suitable examples of such substituents are methyl, ethyl, propyl, butyl, tert-butyl, isobutyl, amyl, isoamyl, hexyl, cyclohexyl, heptyl, octyl, nonyl, decyl, dodecyl, 2-ethylhexyl, pentenyl, butenyl, phenyl, chloro, bromo, iodo, trimethylsilyl, and phenyloctylsilyl.

In Formula (I), (X$^3$) and (X$^4$) are independently selected from the group consisting of (hereafter "Group OMC-II") halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups, provided that these groups do not substantially, and adversely, affect the polymerization activity of the catalyst composition. Alternatively, (X$^3$) and (X$^4$) together may form a diene or polyene moiety or a metallocycle, or may be linked to form a ring.

Suitable examples of aliphatic groups are hydrocarbyl groups, such as, for example, paraffins and olefins. Suitable examples of cyclic groups are cycloparaffins, cycloolefins, cycloacetylenes, and arenes. It is preferred when (X$^3$) and (X$^4$) are selected from the group consisting of halides and hydrocarbyls, where such hydrocarbyls have from 1 to about 10 carbon atoms. It is more preferred when (X$^3$) and (X$^4$) are selected from the group consisting of fluoro, chloro, and methyl.

Suitable examples of diene, polyene or metallocycle moieties include: for diene and polyene:

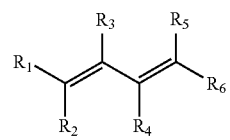

wherein R$_1$-R$_6$ is hydrogen, unsubstituted or substituted hydrocarbyl having from 1 to about 20 carbon atoms and including but not limited to aryl, alkyl, cycloalkyl, alkenyl, cycloalkenyl, cycloalkadienyl, alkynyl, aralkyl, aralkenyl, aralkynyl; and for metallocycle:

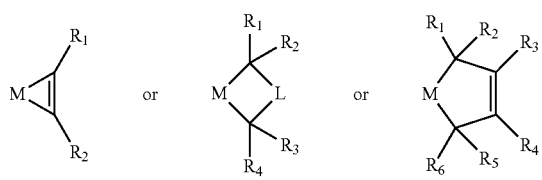

wherein M=transition metal, L=linking group having from 1-6 atoms and $R_1$-$R_6$ is hydrogen, unsubstituted or substituted hydrocarbyl having from 1 to about 20 carbon atoms and including but is not limited to aryl, alkyl, cycloalkyl, alkenyl, cycloalkenyl, cycloalkadienyl, alkynyl, aralkyl, aralkenyl, aralkynyl.

In Formula (I), ($X^2$) can be selected from either Group OMC-I or Group OMC-II.

At least one substituent on ($X^1$) or ($X^2$) can be a bridging group that connects ($X^1$) and ($X^2$), provided that the bridging group does not substantially, and adversely, affect the activity of the catalyst composition. Suitable bridging groups include, but are not limited to, aliphatic groups, cyclic groups, combinations of aliphatic groups and cyclic groups, phosphorous groups, nitrogen groups, organometallic groups, silicon, phosphorus, boron, and germanium.

Suitable examples of aliphatic groups are hydrocarbyl groups, such as, for example, paraffins and olefins. Suitable examples of cyclic groups are cycloparaffins, cycloolefins, cycloacetylenes, and arenes. Suitable organometallic groups include, but are not limited to, substituted silyl derivatives, substituted tin groups, substituted germanium groups, and substituted boron groups.

Suitable examples of such substituents are methyl, ethyl, propyl, butyl, tert-butyl, isobutyl, amyl, isoamyl, hexyl, cyclohexyl, heptyl, octyl, nonyl, decyl, dodecyl, 2-ethylhexyl, pentenyl, butenyl, phenyl, chloro, bromo, iodo, trimethylsilyl, phenyloctylsilyl and mixtures thereof.

Various processes are known to make these organometal compounds. See, for example, U.S. Pat. Nos. 4,939,217; 5,210,352; 5,436,305; 5,401,817; 5,631,335; 5,571,880; 5,191,132; 5,480,848; 5,399,636; 5,565,592; 5,347,026; 5,594,078; 5,498,581; 5,496,781; 5,563,284; 5,554,795; 5,420,320; 5,451,649; 5,541,272; 5,705,478; 5,631,203; 5,654,454; 5,705,579; and 5,668,230; the entire disclosures of which are hereby incorporated by reference to the extent permitted by law.

Specific examples of such organometal compounds are as follows:

bis(cyclopentadienyl)hafnium dichloride; bis(cyclopentadienyl)zirconium dichloride; 1,2-ethanediylbis($\eta^5$-1-indenyl)di-n-butoxyhafnium; 1,2-ethanediylbis($\eta^5$-1-indenyl)dimethylzirconium; 3,3-pentanediylbis($\eta^5$-4,5,6,7-tetrahydro-1-indenyl)hafnium dichloride; methylphenylsilylbis($\eta^5$-4,5,6,7-tetrahydro-1-indenyl)zirconium dichloride; bis(n-butylcyclopentadienyl)bis(di-t-butylamido)hafnium; bis(n-butylcyclopentadienyl)zirconium dichloride; dimethylsilylbis(1-indenyl)zirconium dichloride; octylphenylsilylbis(1-indenyl)hafnium dichloride; dimethylsilylbis($\eta^5$-4,5,6,7-tetrahydro-1-indenyl)zirconium dichloride; dimethylsilylbis(2-methyl-1-indenyl)zirconium dichloride; 1,2-ethanediylbis(9-fluorenyl)zirconium dichloride; indenyl diethoxy titanium(IV) chloride; (isopropylamidodimethylsilyl)cyclopentadienyltitanium dichloride; bis(pentamethylcyclopentadienyl) zirconium dichloride; bis(indenyl) zirconium dichloride; methyloctylsilyl bis (9-fluorenyl) zirconium dichloride; and bis-[1-(N,N-diisopropylamino) boratabenzene]hydridozirconium trifluoromethylsulfonate.

Other suitable organometal compounds are selected from the group consisting of: bis(1-butyl-3-methylcyclopentadienyl)zirconium dichloride; bis(1-butylcyclopentadienyl)hafnium dichloride; [N-(t-butyl)-1,1-dimethyl-1-(tetramethylcyclopentadienyl)silaninato] titanium dichloride; [1-Pr-2-$C_6F_5$Cp][(tBu)$_3$PN]TiCl$_2$; [1-$C_6F_5CH_2$—Ind][t-Bu$_3$PN]TiCl$_2$; (n-propylcyclopentadienyl)(tetramethylcyclopentadienyl) zirconium dichloride; rac-ethylene-bis(tetrahydroindenyl)zirconium dichloride; (5-cyclopentadien-1-ylidene([5-(2,7-di-tert-butylfluoren-9-ylidene]hex-1-ene zirconium dichloride; (n-butylcyclopentadienyl)(1-allylindenyl)zirconium dichloride; [1-(3-n-butylcyclopentadien-1-yl)-1-(2,7-di-tert-butylfluoren-9-yl)-1,1 diphenylmethane] hafnium dichloride; [4-[4-(1,1-dimethyl)phenyl]-2-(1-methylethyl)-1H-inden-1-yl][4-[4-(1,1-dimethylethyl)phenyl]-2-methyl-1H-inden-1-yl]dimethylsilylzirconium dichloride; bisarylamidozirconium dibenzyl; and mixtures thereof.

Preferably, an organometal compound is selected from the group consisting of: bis(n-butylcyclopentadienyl)zirconium dichloride; bis(indenyl)zirconium dichloride; dimethylsilylbis(1-indenyl) zirconium dichloride; methyloctylsilylbis(9-fluorenyl)zirconium dichloride; and mixtures thereof.

Organoaluminum Compounds

Organoaluminum compounds useful herein are denoted by the following general Formula (II):

$$Al(X^5)_n(X^6)_{3-n} \quad (II)$$

In Formula (II), ($X^5$) is a hydride or hydrocarbyl having from 1 to about 20 carbon atoms. Preferably, ($X^5$) is an alkyl having from 1 to about 10 carbon atoms. However, most preferably ($X^5$) is selected from the group consisting of methyl, ethyl, propyl, butyl, and isobutyl.

In Formula (II), ($X^6$) is an anionic species independently selected from the group consisting of a halide selected from the group consisting of chloride, iodide, fluoride and bromide; bromate; chlorate; perchlorate; sulfate; sulfamate; carbonate; hydrogen-carbonate; carbamate; nitrite; nitrate; oxalate; phosphate; selenate; sulfamate; azide; alkoxide; amide, including $NR_2$ or $R[CON(R)]_a$, wherein R is independently H or a $C_1$-$C_{20}$ unsubstituted or substituted hydrocarbyl group and a=1-4; and carboxylate, including $R[CO_2]_b$, wherein R is independently H or a $C_1$-$C_{20}$ unsubstituted or substituted hydrocarbyl group and b=1-4. Preferably, ($X^6$) is independently selected from the group consisting of fluoride and chloride. However, most preferably ($X^6$) is chloride.

In Formula (II), "n" is a number from 1 to 3 inclusive; preferably, "n" is 3.

Examples of suitable compounds consistent with Formula (II) include:

trimethylaluminum; triethylaluminum (TEA or TEAL); tripropylaluminum; diethylaluminum ethoxide; tributylaluminum; triisobutylaluminum hydride; triisobutylaluminum (TIBAL); diethylaluminum chloride; and mixtures thereof.

TEA and TIBAL are preferred organoaluminum compounds.

Preparation of Catalyst Compositions

Catalyst compositions can be produced by contacting the organometal compound, the pillared and ion exchanged clay, and the organoaluminum compound. Contacting can occur in a variety of ways, such as, for example, blending. Furthermore, each of the components or compounds can be fed into a reactor separately, or various combinations of the components or compounds can be contacted with one another before being further contacted in a reactor with the remaining compound(s) or component(s), or all three components or compounds can be contacted together before being introduced into a reactor.

One method is to first contact an organometal compound and a pillared, ion-exchanged, calcined clay together, for about 1 minute to about 24 hours; preferably, 1 minute to 1 hour; at a temperature from about 10° C. to about 200° C., preferably 15° C. to 80° C.; to form a first mixture, and then contact this first mixture with an organoaluminum compound to form the catalyst composition.

Preferably, the organometal compound, the organoaluminum compound, and the pillared, ion-exchanged, calcined clay are precontacted before introduction or injection into a reactor for about 1 minute to about 24 hours, preferably, 1 minute to 1 hour; at a temperature from about 10° C. to about 200° C., preferably 20° C. to 80° C.; in order to provide a suitably active catalyst.

A weight ratio of organoaluminum compound to the pillared, ion-exchanged, calcined clay in the catalyst composition ranges from about 5:1 to about 1:1000, preferably, from about 3:1 to about 1:100, and most preferably, from 1:1 to 1:50.

A weight ratio of the pillared, ion-exchanged, calcined clay to the organometal compound in the catalyst composition ranges from about 10,000:1 to about 1:1, preferably, from about 1000:1 to about 10:1, and most preferably, from about 250:1 to 20:1. These ratios are based on the amount of the components combined to give the catalyst composition.

After contacting, the catalyst composition comprises a post-contacted organometal compound, a post-contacted organoaluminum compound, and a post-contacted pillared, ion-exchanged, calcined clay component. The post-contacted pillared, ion-exchanged, calcined clay comprises the majority, by weight, of the catalyst composition. It is not uncommon in the field of catalyst technology that specific components of a catalyst composition are not precisely known, therefore, for purposes of the present invention, the catalyst composition is also described as comprising post-contacted compounds or components.

The catalyst composition exhibits an activity, in other words a polymerization activity that is expressed as weight of polymer polymerized per weight of catalyst support or carrier (absent the metal-containing catalyst components). For purposes of the present invention and as reported in the examples, activity is expressed as the weight of polymer produced divided by the weight of pillared, ion-exchanged and dried/calcined clay per hour, i.e., g/g/hr. Activity of catalysts produced according to the methods and compositions disclosed herein are greater than a catalyst composition that uses the same organometal compound, and the same organoaluminum compound, but uses pillared clay comprising a rare earth or lanthanide series metal, but that has not been ion exchanged as disclosed hereinabove and shown in the comparative or control example hereinafter. The activity values disclosed in the examples are measured under slurry polymerization conditions, using isobutane as the diluent, and with a polymerization temperature of about 50° C. to about 150° C., for example 90° C., and an ethylene pressure of about 300 to about 800 total psi, for example 450 total psi of combined ethylene and isobutane. When comparing activities, polymerization should be conducted under the same or substantially the same polymerization conditions.

Preferably the activity is greater than about 500 grams of polyethylene polymer per gram of pillared, ion-exchanged, calcined clay per hour (g/g/hr), more preferably greater than about 750, even more preferably greater than 1,000, and most preferably greater than 1,500. Still more preferably improved activity is observed using the activator support disclosed herein, achieving activity levels of 600, 700, 800, 900, 1000, 1100, 1200, 1300, 1400, 1500, 1600, 1700, 1800 g/g/hr or greater. Activity levels can be obtained in the range of 500-1800, as well as intermediate values and ranges, or 525-1700, or 500-1400 g/g/hr. Alternatively, by applying the teachings herein, activity levels can be achieved that are in a range between two of the values recited immediately above and expressed as g/g/hr. As disclosed in the examples, activity is typically measured under slurry homopolymerization conditions, using isobutane as the diluent, and with a polymerization temperature of 90° C., and a combined ethylene and isobutane pressure of 450 total psi and a (1-Bu,3-MeCp)$_2$ZrCl$_2$ and triethylaluminum catalyst composition.

One of the important aspects of this invention is that no aluminoxane needs to be used in order to form the catalyst composition. Aluminoxane is an expensive compound that greatly increases polymer production costs. This also means that no water is needed to help form such aluminoxanes. This is beneficial because water can sometimes kill a polymerization process. Additionally, it should be noted that no organoboron compound or ionizing compound, such as borate compounds, need to be used in order to form an active catalyst composition. In summary, this means that the catalyst composition, which is heterogeneous, and which can be used for polymerizing monomers or monomers and one or more comonomers, can be easily and inexpensively produced because of the absence of any aluminoxane compounds, boron compounds or borate compounds. Although aluminoxane, boron or borate compounds are not needed in the preferred embodiments, these compounds can be used in reduced amounts or typical amounts in other embodiments of this invention.

Optional Aluminoxane Cocatalyst

In one aspect, the present invention provides a catalyst composition comprising a metallocene compound, a support-activator, and an organoaluminum compound, as disclosed herein. In another aspect, the present invention provides a catalyst composition comprising an optional aluminoxane cocatalyst in addition to these other components.

Aluminoxanes are also referred to as poly(hydrocarbyl aluminum oxides) or organoaluminoxanes. The other catalyst components are typically contacted with the aluminoxane in a saturated hydrocarbon compound solvent, though any solvent which is substantially inert to the reactants, intermediates, and products of the activation step can be used. The catalyst composition formed in this manner may be collected by methods known to those of skill in the art, including but not limited to filtration, or the catalyst composition may be introduced into the polymerization reactor without being isolated.

The aluminoxane compound of this invention is an oligomeric aluminum compound, wherein the aluminoxane compound can comprise linear structures, cyclic, or cage structures, or typically mixtures of all three. Cyclic aluminoxane compounds having the formula:

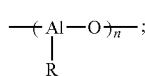

wherein R is a linear or branched alkyl having from 1 to 10 carbon atoms, and n is an integer from 3 to about 10 are encompassed by this invention. The (AlRO)$_n$ moiety shown here also constitutes the repeating unit in a linear aluminoxane. Thus, linear aluminoxanes having the formula:

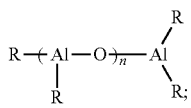

wherein R is a linear or branched alkyl having from 1 to 10 carbon atoms, and n is an integer from 1 to about 50, are also encompassed by this invention.

Further, aluminoxanes may also have cage structures of the formula $R^t_{5m+\alpha}R^b_{m-\alpha}Al_{4m}O_{3m}$, wherein m is 3 or 4 and $\alpha$ is $=n_{Al(3)}-n_{O(2)}+n_{O(4)}$; wherein $n_{Al(3)}$ is the number of three coordinate aluminum atoms, $n_{O(2)}$ is the number of two coordinate oxygen atoms, $n_{O(4)}$ is the number of 4 coordinate oxygen atoms, $R^t$ represents a terminal alkyl group, and $R^b$ represents a bridging alkyl group; wherein R is a linear or branched alkyl having from 1 to 10 carbon atoms.

Thus, aluminoxanes that can serve as optional cocatalysts in this invention are generally represented by formulas such as (R—Al—O)$_n$, R(R—Al—O)$_n$AlR$_2$, and the like, wherein the R group is typically a linear or branched C$_1$-C$_6$ alkyl such as methyl, ethyl, propyl, butyl, pentyl, or hexyl wherein n typically represents an integer from 1 to about 50. In one embodiment, the aluminoxane compounds of this invention include, but are not limited to, methylaluminoxane, ethylaluminoxane, n-propylaluminoxane, iso-propylaluminoxane, n-butylaluminoxane, t-butylaluminoxane, sec-butylaluminoxane, iso-butylaluminoxane, 1-pentylaluminoxane, 2-pentylaluminoxane, 3-pentyl-aluminoxane, iso-pentylaluminoxane, neopentylaluminoxane, or combinations thereof.

While organoaluminoxanes with different types of R groups are encompassed by the present invention, methyl aluminoxane (MAO), ethyl aluminoxane, or isobutyl aluminoxane are typical optional cocatalysts used in the catalyst compositions of this invention. These aluminoxanes are prepared from trimethylaluminum, triethylaluminum, or triisobutylaluminum, respectively, and are sometimes referred to as poly(methyl aluminum oxide), poly(ethyl aluminum oxide), and poly(isobutyl aluminum oxide), respectively. It is also within the scope of the invention to use an aluminoxane in combination with a trialkylaluminum, such as disclosed in U.S. Pat. No. 4,794,096, which is herein incorporated by reference in its entirety.

The present invention contemplates many values of n in the aluminoxane formulas (R—Al—O)$_n$ and R(R—Al—O)$_n$AlR$_2$, and typically n is at least about 3. However, depending upon how the organoaluminoxane is prepared, stored, and used, the value of n may be variable within a single sample of aluminoxane, and such a combination of organoaluminoxanes are comprised in the methods and compositions of the present invention.

In preparing the catalyst composition of this invention comprising optional aluminoxane, the molar ratio of the aluminum present in the aluminoxane to the metallocene compound(s) in the composition can be lower than the typical amounts used in the absence of the support-activator of the present invention. Such previously typical amounts are from about 1:10 to about 100,000:1. In another aspect, the previous molar ratio of the aluminum in the aluminoxane to the metallocene in the composition is usually from about 5:1 to about 15,000:1, but it can be less when a support-activator is used. Expressed alternatively, the amount of optional aluminoxane added to a polymerization zone can be less than the previous typical amount within a range of about 0.01 mg/L to about 1000 mg/L, from about 0.1 mg/L to about 100 mg/L, or from about 1 mg/L to about 50 mg/L.

Alternatively, aluminoxane can be used in an amount typically used in the prior art, but with the additional use of a support-activator of the present invention in order to obtain further advantages for such a combination. Thus, catalyst compositions taking advantage of the present invention can be substantially free of aluminoxane or free of aluminoxane or may contain aluminoxane in reduced amounts or amounts equivalent to those used in the prior art with metallocenes in general or with specific metallocenes used in combination with preferred amounts of aluminoxane.

Organoaluminoxanes can be prepared by various procedures which are well known in the art. Examples of organoaluminoxane preparations are disclosed in U.S. Pat. Nos. 3,242,099 and 4,808,561, each of which is incorporated by reference herein, in its entirety. One example of how an aluminoxane may be prepared is as follows. Water, which is dissolved in an inert organic solvent, may be reacted with an aluminum alkyl compound such as AlR$_3$ to form the desired organoaluminoxane compound. It is generally believed that this synthetic method can afford a mixture of both linear and cyclic (R—Al—O)$_n$ aluminoxane species, both of which are encompassed by this invention. Alternatively, organoaluminoxanes may be prepared by reacting an aluminum alkyl compound such as AlR$_3$ with a hydrated salt, such as hydrated copper sulfate, in an inert organic solvent.

Optional Organoboron Cocatalyst

In one aspect, the present invention provides a catalyst composition comprising a metallocene compound, a support-activator, and an organoaluminum compound, as disclosed herein. In another aspect, the present invention provides a catalyst composition comprising an optional organoboron cocatalyst in addition to these other components.

In one aspect, the organoboron compound comprises neutral boron compounds, borate salts, or combinations thereof. For example, the organoboron compounds of this invention can comprise a fluoroorgano boron compound, a fluoroorgano borate compound, or a combination thereof. Any fluoroorgano boron or fluoroorgano borate compound known in the art can be utilized. The term fluoroorgano boron compounds has its usual meaning to refer to neutral compounds of the form BY$_3$. The term fluoroorgano borate compound also has its usual meaning to refer to the monoanionic salts of a fluoroorgano boron compound of the form [cation]$^+$[BY$_4$]$^-$, where Y represents a fluorinated organic group. For convenience, fluoroorgano boron and fluoroorgano borate compounds are typically referred to collectively by organoboron compounds, or by either name as the context requires.

Examples of fluoroorgano borate compounds that can be used as cocatalysts in the present invention include, but are not limited to, fluorinated aryl borates such as, N,N-dimethylanilinium tetrakis(pentafluorophenyl)borate, triphenylcarbenium tetrakis(pentafluorophenyl)borate, lithium tetrakis-(pentafluorophenyl)borate, N,N-dimethylanilinium tetrakis[3,5-bis(trifluoro-methyl)phenyl]borate, triphenylcarbenium tetrakis[3,5-bis(trifluoromethyl)-phenyl]borate, and the like, including mixtures thereof. Examples of fluoroorgano boron compounds that can be used as cocatalysts in the present invention include, but are not limited to, tris(pentafluorophenyl)boron, tris[3,5-bis(trifluoromethyl)phenyl]boron, and the like, including mixtures thereof.

Although not intending to be bound by the following theory, these examples of fluoroorgano borate and fluoroorgano boron compounds, and related compounds, are thought to form "weakly-coordinating" anions when combined with organometal compounds, as disclosed in U.S. Pat. No. 5,919,983, which is incorporated herein by reference in its entirety.

Generally, any amount of organoboron compound can be utilized in this invention. In one aspect, the molar ratio of the organoboron compound to the metallocene compound in the composition is from about 0.1:1 to about 10:1, but it will be appreciated that the amount can be reduced compared to the amount required in the absence of a support-activator. Typically, the amount of the fluoroorgano boron or fluoroorgano borate compound used as a cocatalyst for the metallocene is in a range of from about 0.5 moles to about 10 moles of boron compound per mole of metallocene compound. In one aspect, the amount of fluoroorgano boron or fluoroorgano borate compound used as a cocatalyst for the metallocene is in a range of from about 0.8 moles to about 5 moles of boron compound per mole of metallocene compound. Again, these amounts can be adjusted downward in the presence of a support-activator.

Optional Ionizing Compound Cocatalyst

In one aspect, the present invention provides a catalyst composition comprising a metallocene compound, a support-activator, and an organoaluminum compound, as disclosed herein. In another aspect, the present invention provides a catalyst composition comprising an optional ionizing compound cocatalyst in addition to these other components. Examples of ionizing compound are disclosed in U.S. Pat. Nos. 5,576,259 and 5,807,938, each of which is incorporated herein by reference, in its entirety.

An ionizing compound is an ionic compound which can function to enhance activity of the catalyst composition. While not intending to be bound by theory, it is believed that the ionizing compound may be capable of reacting with the metallocene compound and converting the metallocene into a cationic metallocene compound. Again, while not intending to be bound by theory, it is believed that the ionizing compound may function as an ionizing compound by completely or partially extracting an anionic ligand, possibly a non-$\eta^5$-alkadienyl ligand such as $(X^3)$ or $(X^4)$, from the metallocene. However, the ionizing compound is an activator regardless of whether it is ionizes the metallocene, abstracts an $(X^3)$ or $(X^4)$ ligand in a fashion as to form an ion pair, weakens the metal-$(X^3)$ or metal-$(X^4)$ bond in the metallocene, simply coordinates to an $(X^3)$ or $(X^4)$ ligand, or any other mechanisms by which activation may occur. Further, it is not necessary that the ionizing compound activate the metallocene only. The activation function of the ionizing compound is evident in the enhanced activity of catalyst composition as a whole, as compared to a catalyst composition containing catalyst composition that does not comprise any ionizing compound.

Examples of ionizing compounds include, but are not limited to, the following compounds: tri(n-butyl)ammonium tetrakis(p-tolyl)borate, tri(n-butyl)ammonium tetrakis(m-tolyl)borate, tri(n-butyl)ammonium tetrakis(2,4-dimethyl) borate, tri(n-butyl)ammonium tetrakis(3,5-dimethylphenyl) borate, tri(n-butyl)ammonium tetrakis[3,5-bis(trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl) borate, N,N-dimethylanilinium tetrakis(3,5-dimethylphenyl)borate, N,N-dimethylanilinium tetrakis[3,5-bis(trifluoromethyl)phenyl]borate, N,N-dimethylanilinium tetrakis (pentafluorophenyl)borate, triphenylcarbenium tetrakis(p-tolyl)borate, triphenylcarbenium tetrakis(m-tolyl)borate, triphenylcarbenium tetrakis(2,4-dimethylphenyl)borate, triphenylcarbenium tetrakis(3,5-dimethylphenyl)borate, triphenylcarbenium tetrakis[3,5-bis(trifluoro-methyl)phenyl]borate, triphenylcarbenium tetrakis(pentafluorophenyl)borate, tropylium tetrakis(p-tolyl)borate, tropylium tetrakis(m-tolyl)borate, tropylium tetrakis(2,4-dimethylphenyl)borate, tropylium tetrakis(3,5-dimethylphenyl)borate, tropylium tetrakis[3,5-bis(trifluoromethyl)phenyl]borate, tropylium tetrakis(pentafluorophenyl)borate, lithium tetrakis(pentafluorophenyl)borate, lithium tetrakis(phenyl)borate, lithium tetrakis(p-tolyl)borate, lithium tetrakis(m-tolyl)borate, lithium tetrakis(2,4-dimethylphenyl)borate, lithium tetrakis(3,5-dimethylphenyl)borate, lithium tetrafluoroborate, sodium tetrakis(pentafluorophenyl)borate, sodium tetrakis (phenyl) borate, sodium tetrakis(p-tolyl)borate, sodium tetrakis(m-tolyl)borate, sodium tetrakis(2,4-dimethylphenyl) borate, sodium tetrakis(3,5-dimethylphenyl)borate, sodium tetrafluoroborate, potassium tetrakis(pentafluorophenyl)borate, potassium tetrakis(phenyl)borate, potassium tetrakis(p-tolyl)borate, potassium tetrakis(m-tolyl) borate, potassium tetrakis(2,4-dimethylphenyl)borate, potassium tetrakis(3,5-dimethylphenyl) borate, potassium tetrafluoroborate, tri(n-butyl) ammonium tetrakis(p-tolyl)aluminate, tri(n-butyl) ammonium tetrakis(m-tolyl)aluminate, tri(n-butyl)ammonium tetrakis(2,4-dimethyl)aluminate, tri(n-butyl)ammonium tetrakis(3,5-dimethylphenyl)aluminate, tri(n-butyl) ammonium tetrakis(pentafluorophenyl)aluminate, N,N-dimethylanilinium tetrakis(p-tolyl)aluminate, N,N-dimethylanilinium tetrakis(m-tolyl) aluminate, N,N-dimethylanilinium tetrakis(2,4-dimethylphenyl)aluminate, N,N-dimethylanilinium tetrakis(3,5-dimethyl-phenyl)aluminate, N,N-dimethylanilinium tetrakis (pentafluorophenyl)aluminate, triphenylcarbenium tetrakis(p-tolyl)aluminate, triphenylcarbenium tetrakis(m-tolyl)aluminate, triphenylcarbenium tetrakis(2,4-dimethylphenyl)aluminate, triphenylcarbenium tetrakis(3,5-dimethylphenyl)aluminate, triphenylcarbenium tetrakis-(pentafluorophenyl)aluminate, tropylium tetrakis(p-tolyl)aluminate, tropylium tetrakis(m-tolyl)aluminate, tropylium tetrakis(2,4-dimethylphenyl) aluminate, tropylium tetrakis(3,5-dimethylphenyl) aluminate, tropylium tetrakis(pentafluorophenyl)aluminate, lithium tetrakis(pentafluorophenyl)aluminate, lithium tetrakis(phenyl)aluminate, lithium tetrakis(p-tolyl)aluminate, lithium tetrakis(m-tolyl)aluminate, lithium tetrakis(2,4-dimethylphenyl)aluminate, lithium tetrakis(3,5-dimethylphenyl)aluminate, lithium tetrafluoroaluminate, sodium tetrakis (pentafluorophenyl)aluminate, sodium tetrakis(phenyl) aluminate, sodium tetrakis(p-tolyl)aluminate, sodium tetrakis(m-tolyl)aluminate, sodium tetrakis(2,4-dimethylphenyl)aluminate, sodium tetrakis(3,5-dimethylphenyl) aluminate, sodium tetrafluoroaluminate, potassium tetrakis (pentafluorophenyl)aluminate, potassium tetrakis(phenyl) aluminate, potassium tetrakis(p-tolyl)aluminate, potassium tetrakis(m-tolyl)aluminate, potassium tetrakis(2,4-dimethylphenyl)aluminate, potassium tetrakis(3,5-dimethylphenyl) aluminate, potassium tetrafluoroaluminate, However, the ionizing compound is not limited to the above enumerated list in the present invention.

In another embodiment of this invention, a process comprising contacting at least one monomer and the catalyst composition to produce at least one polymer is provided. The term "polymer" as used in this disclosure includes homopolymers and copolymers. The catalyst composition can be used to polymerize at least one monomer to produce a homopolymer or a copolymer. Usually, homopolymers are comprised of monomer residues, having 2 to about 20 carbon atoms per molecule, preferably 2 to about 10 carbon atoms per molecule. Currently, it is preferred when at least one monomer is an olefin monomer selected from the group consisting of ethylene, propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, and mixtures thereof.

When a homopolymer is desired, it is most preferred to polymerize ethylene or propylene. When a copolymer is desired, the copolymer comprises monomer residues, preferably olefin monomer residues as above, and one or more comonomer residues, each having from about 2 to about 20 carbon atoms per molecule. Suitable comonomers include, but are not limited to, aliphatic 1-olefins having from 3 to 20 carbon atoms per molecule, such as, for example, propylene, 1-butene, 1-pentene, 4-methyl-1-pentene, 1-hexene, 1-octene, and other olefins and conjugated or nonconjugated diolefins such as 1,3-butadiene, isoprene, piperylene, 2,3-dimethyl-1,3-butadiene, 1,4-pentadiene, 1,7-hexadiene, and other such diolefins and mixtures thereof. When a copolymer is desired, it is preferred to polymerize ethylene and at least one comonomer selected from the group consisting of 1-butene, 1-pentene, 1-hexene, 1-octene, and 1-decene. The amount of comonomer introduced into a reactor zone to produce a copolymer is generally from about 0.01 to about 10 weight percent comonomer based on the total weight of the monomer and comonomer, preferably, about 0.01 to about 5, and most preferably, 0.1 to 4. Alternatively, an amount sufficient to give the above described concentrations, by weight, in the copolymer produced can be used.

Processes that can polymerize at least one monomer to produce a polymer are known in the art, such as, for example, slurry polymerization, gas phase polymerization, and solution polymerization. It is preferred to perform a slurry polymerization in a loop reaction zone. Suitable diluents used in slurry polymerization are well known in the art and include hydrocarbons which are liquid under reaction conditions. The term "diluent" as used in this disclosure does not necessarily mean an inert material; it is possible that a diluent can contribute to polymerization. Suitable hydrocarbons include, but are not limited to, cyclohexane, isobutane, n-butane, propane, n-pentane, isopentane, neopentane, and n-hexane. Furthermore, it is most preferred to use isobutane as the diluent in a slurry polymerization. Examples of such technology can be found in U.S. Pat. Nos. 4,424,341; 4,501,885; 4,613,484; 4,737,280; and 5,597,892; the entire disclosures of which are hereby incorporated by reference.

Use of the Support-Activator and Catalysts in Polymerization Processes

Polymerizations using the catalysts of this invention can be carried out in any manner known in the art. Such polymerization processes include, but are not limited to slurry polymerizations, gas phase polymerizations, solution polymerizations, and the like, including multi-reactor combinations thereof. Thus, any polymerization zone known in the art to produce alpha-olefin-containing polymers can be utilized, including polyethylene, polypropylene, ethylene alpha-olefin copolymers, as well as more generally to substituted olefins, such as norbornene. For example, a stirred reactor can be utilized for a batch process, or the reaction can be carried out continuously in a loop reactor or in a continuous stirred reactor.

After catalyst activation, a catalyst composition is used to homopolymerize ethylene, or copolymerize ethylene with a comonomer. In one aspect, a typical polymerization method is a slurry polymerization process (also known as the particle form process), which is well known in the art and is disclosed, for example in U.S. Pat. No. 3,248,179, which is incorporated by reference herein, in its entirety. Other polymerization methods of the present invention for slurry processes are those employing a loop reactor of the type disclosed in U.S. Pat. No. 3,248,179, and those utilized in a plurality of stirred reactors either in series, parallel, or combinations thereof, wherein the reaction conditions are different in the different reactors, which is also incorporated by reference herein, in its entirety.

In one aspect, polymerization temperature for this invention may range from about 60° C. to about 280° C., and in another aspect, polymerization reaction temperature may range from about 70° C. to about 110° C.

The polymerization reaction typically occurs in an inert atmosphere, that is, an atmosphere substantial free of oxygen and under substantially anhydrous conditions, thus, in the absence of water as the reaction begins. Therefore a dry, inert atmosphere, for example, dry nitrogen or dry argon, is typically employed in the polymerization reactor.

The polymerization reaction pressure can be any pressure that does not terminate the polymerization reaction, and it typically conducted at a pressure higher than the pretreatment pressures. In one aspect, polymerization pressures may be from about atmospheric pressure to about 1000 psig. In another aspect, polymerization pressures may be from about 50 psig to about 800 psig. Further, hydrogen can be used in the polymerization process of this invention to control polymer molecular weight.

Polymerizations using the catalysts of this invention can be carried out in any manner known in the art. Such processes that can polymerize monomers into polymers include, but are not limited to slurry polymerizations, gas phase polymerizations, solution polymerizations, and multi-reactor combinations thereof. Thus, any polymerization zone known in the art to produce olefin-containing polymers can be utilized. For example, a stirred reactor can be utilized for a batch process, or the reaction can be carried out continuously in a loop reactor or in a continuous stirred reactor. Typically, the polymerizations disclosed herein are carried out using a slurry polymerization process in a loop reaction zone. Suitable diluents used in slurry polymerization are well known in the art and include hydrocarbons which are liquid under reaction conditions. The term "diluent" as used in this disclosure does not necessarily mean an inert material, as this term is meant to include compounds and compositions that may contribute to polymerization process. Examples of hydrocarbons that can be used as diluents include, but are not limited to, cyclohexane, isobutane, n-butane, propane, n-pentane, isopentane, neopentane, and n-hexane. Typically, isobutane is used as the diluent in a slurry polymerization. Examples of this technology are found in U.S. Pat. Nos. 4,424,341; 4,501,885; 4,613,484; 4,737,280; and 5,597,892; each of which is incorporated by reference herein, in its entirety.

For purposes of the invention, the term polymerization reactor includes any polymerization reactor or polymerization reactor system known in the art that is capable of polymerizing olefin monomers to produce homopolymers or copolymers of the present invention. Such reactors can comprise slurry reactors, gas-phase reactors, solution reactors, or any combination thereof. Gas phase reactors can comprise fluidized bed reactors or tubular reactors. Slurry reactors can comprise vertical loops or horizontal loops. Solution reactors can comprise stirred tank or autoclave reactors.

Polymerization reactors suitable for the present invention can comprise at least one raw material feed system, at least one feed system for catalyst or catalyst components, at least one reactor system, at least one polymer recovery system or any suitable combination thereof. Suitable reactors for the present invention can further comprise any, or combination of, a catalyst storage system, an extrusion system, a cooling system, a diluent recycling system, or a control system. Such reactors can comprise continuous take-off and direct recycling of catalyst, diluent, and polymer. Generally, continuous processes can comprise the continuous introduction of a monomer, a catalyst, and a diluent into a polymerization reactor and the continuous removal from this reactor of a suspension comprising polymer particles and the diluent.

Polymerization reactor systems of the present invention can comprise one type of reactor per system or multiple reactor systems comprising two or more types of reactors operated in parallel or in series. Multiple reactor systems can comprise reactors connected together to perform polymerization, or reactors that are not connected. The polymer can be polymerized in one reactor under one set of conditions, and then the polymer can be transferred to a second reactor for polymerization under a different set of conditions.

In one aspect of the invention, the polymerization reactor system can comprise at least one loop slurry reactor. Such reactors are known in the art and can comprise vertical or horizontal loops. Such loops can comprise a single loop or a series of loops. Multiple loop reactors can comprise both vertical and horizontal loops. The slurry polymerization can be performed in an organic solvent that can disperse the catalyst and polymer. Examples of suitable solvents include butane, hexane, cyclohexane, octane, and isobutane. Monomer, solvent, catalyst and any comonomer are continuously fed to a loop reactor where polymerization occurs. Polymerization can occur at low temperatures and pressures. Reactor effluent can be flashed to remove the solid resin.

In yet another aspect of this invention, the polymerization reactor can comprise at least one gas phase reactor. Such systems can employ a continuous recycle stream containing one or more monomers continuously cycled through the fluidized bed in the presence of the catalyst under polymerization conditions. The recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone.

In still another aspect of the invention, the polymerization reactor can comprise a tubular reactor. Tubular reactors can make polymers by free radical initiation, or by employing the catalysts typically used for coordination polymerization. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams are intermixed for polymerization. Heat and pressure can be employed appropriately to obtain optimal polymerization reaction conditions.

In another aspect of the invention, the polymerization reactor can comprise a solution polymerization reactor. During solution polymerization, the monomer is contacted with the catalyst composition by suitable stirring or other means. A carrier comprising an inert organic diluent or excess monomer can be employed. If desired, the monomer can be brought in the vapor phase into contact with the catalytic reaction product, in the presence or absence of liquid material. The polymerization zone is maintained at temperatures and pressures that will result in the formation of a solution of the polymer in a reaction medium. Agitation can be employed during polymerization to obtain better temperature control and to maintain uniform polymerization mixtures throughout the polymerization zone. Adequate means are utilized for dissipating the exothermic heat of polymerization. The polymerization can be effected in a batch manner, or in a continuous manner. The reactor can comprise a series of at least one separator that employs high pressure and low pressure to separate the desired polymer.

In a further aspect of the invention, the polymerization reactor system can comprise the combination of two or more reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactors. Alternatively, polymerization in multiple reactors can include the manual transfer of polymer from one reactor to subsequent reactors for continued polymerization. Such reactors can include any combination including, but not limited to, multiple loop reactors, multiple gas reactors, a combination of loop and gas reactors, a combination of autoclave reactors or solution reactors with gas or loop reactors, multiple solution reactors, or multiple autoclave reactors.

The catalyst compositions used in this process produce good quality polymer particles without substantially fouling the reactor. When the catalyst composition is to be used in a loop reactor zone under slurry polymerization conditions, it is preferred when the particle size of the metal salt ion exchanged-rare-earth-containing PILC compound is in the range of about 10 to about 1000 microns, preferably about 25 to about 500 microns, more preferably 50 to 200 microns, and most preferably about 30 to about 100 microns, for best control during polymerization.

Polymers produced using the catalyst composition can be formed into various articles, such as, for example, household containers and utensils, film products, drums, fuel tanks, pipes, geomembranes, and liners. Various processes can form these articles. Typically, additives and modifiers are added to the polymer in order to provide desired effects, including combinations of physical, structural and flow properties. It is believed that by using the invention described herein, articles can be produced at a lower cost, while maintaining most, if not all, polymer properties typically observed for polymers produced using catalysts of the types disclosed herein, including in particular, metallocene catalyst compositions.

In a more specific embodiment of this invention, a process is provided to produce a catalyst composition, the process comprising (optionally, "consisting essentially of", or "consisting of"):

(1) contacting a suitable smectite clay with a pillaring agent comprising at least one rare-earth or lanthanide group metal, or at least one rare earth or lanthanide group metal and gallium, to produce a pillared clay and ion exchanging the pillared clay to obtain a modified pillared clay;

(2) calcining the modified pillared clay at a temperature within a range of 150° C. to 400° C. to produce a calcined clay composition exhibiting a basal $d_{100}$ spacing equal to or greater than about 20 Å, or equal to or greater than about 20 Å to about 60 Å;

(3) combining the calcined composition of (2) and, for example, bis(1-butyl-3-methylcyclopentadienyl) zirconium dichloride at a temperature within the range of 15° C. to 80° C. to produce a mixture; and (4) after between 1 minute and 1 hour, combining the mixture in (3) and triisobutylaluminum to produce the catalyst composition.

Hydrogen can be used in this invention in a polymerization process to control polymer molecular weight.

In an embodiment, about 19 wt. % solids in deionized water of clay treated with Ce—Al pillaring solution as described herein, is mixed, for example in a centrifuge tube with 25 mL of a 0.1 molar solution of $Met_mX_n$, such as Met=Mg or Zn and X=Cl; n=2. The tube is placed on an end-over-end shaker for several hours, in order to produce a suspension or slurry, after which the mixture is centrifuged, such as for example, for about 1 hour at 5000 rpm. The supernatant is discarded and replaced with fresh 0.1 M $Met_mX_n$ solution in deionized water of the same metal salt and the solids are re-suspended using, for example, a spatula and the process steps, i.e. shaking, centrifuging, decanting and adding fresh solution, is repeated several times (at least 2 times and as many as 3 to 6 or more times, for example, as many as 7, 8, 9 or 10 times or more). After the last centrifugation of the slurry containing added $Met_mX_n$ is decanted, de-ionized water is added instead of $Met_mX_n$ solution. The clay is again re-suspended, for example using a spatula, shaken as before, and then centrifuged. Washing with de-ionized water is preferably repeated until an aliquot of the supernatant of the centrifuged sample affords little to no precipitate when treated with a few drops of 1 molar $AgNO_3$ (aq.), indicating that the sample is free or substantially free of chloride ions. Alternatively, as described above, a satisfactory result is obtained according to a conductivity test.

X-Ray Diffraction (XRD) Test Method

The XRD test method applied to clays and modified clays disclosed herein for determining basal spacing is described in, for example, U.S. Pat. No. 5,202,295 (McCauley) at col. 27, lns. 22-43:

X-ray patterns of reaction products are obtained by X-ray analysis, using standard X-ray powder diffraction techniques. The radiation source is a high-intensity, copper target, X-ray tube operated at 50 Kv and 40 ma. The diffraction pattern from the copper K-alpha radiation and graphite monochromator is suitably recorded by an X-ray spectrometer scintillation counter, pulse height analyzer and strip chart recorder. Flat compressed powder samples are scanned at 2 (2 theta) per minute, using a two second time constant. Interplanar spacings (d) in Angstrom units are obtained from the position of the diffraction peaks expressed as 2r where r is the Bragg angle as observed on the strip chart. Intensities are determined from the heights of diffraction peaks after subtracting background, "$I_o$" being the intensity of the strongest line or peak, and "I" being the intensity of each of the other peaks. Alternatively, the X-ray patterns can be obtained by use of computer based techniques using copper K-alpha radiation, Siemens type K-805 X-ray sources and Siemens D-500 X-ray powder diffractometers available from Siemens Corporation, Cherry Hill, N.J.

EXAMPLES

Preparation of Modified Clay (a) Pillaring agent synthesis procedure: 1,293.7 g of Chlorhydrol (23.66% $Al_2O_3$ and 7.9% Cl) and 69.46 g of $Ce(NO_3)_3$ solution (28.58% $CeO_2$) is mixed in a one liter Nalgene® bottle and placed in an oven at 100° C. for 21 days.

(b) Clay-Pillar Slurry Procedure: 1,227 g of pillaring agent as prepared in (a) is added to 60 kg of water to which 1.8 kg of HPM-20 clay is added and the mixture is placed under high shear. The resulting slurry is allowed to settle and the supernatant is decanted. Deionized water is added in an amount to produce the original volume and the slurry is agitated and allowed to settle again. This procedure is repeated until the supernatant liquid is free or substantially free of: (i) residual anions originally present in the aqueous pillaring agent; or (ii) unconsumed pillaring agent or byproduct thereof; or (iii) both (i) and (ii), as determined, for example, by a negative silver nitrate test for chloride ions or when the conductivity of the supernatant is less than 20,000 μS/cm using, for example, commercially available conductance meters such as offered by Radiometer Analytical according to the instruction manual and references provided with the test instrument.

(c) Cation exchange procedure of pillared clay slurry:

A 50 mL centrifuge tube is charged with 20 mL of a modified clay prepared as described in (b) above (in other words, about 19 wt. % solids in deionized water of the clay treated with Ce—Al pillaring solution as described above), along with 25 mL of a 0.1 molar solution of $Met_mX_n$, such as Met=Mg or Zn and X=Cl; n=2. The tube is placed on an end-over-end shaker for several hours, in order to produce a suspension or slurry, after which it is centrifuged for about 1 hour at 5000 rpm. The supernatant is discarded and replaced with fresh 0.1 M $Met_mX_n$ solution in deionized water of the same metal salt and the solids are re-suspended using, for example, a spatula and the process steps, i.e. shaking, centrifuging, decanting and adding fresh solution, is repeated several times (preferably at least 2 times, more preferably 3 to 4 times or as many as 3 to 6 or more times, for example, as many as 7, 8, 9 or 10 times or more). After the last centrifugation of the slurry containing added $Met_mX_n$ is decanted, de-ionized water is added instead of $Met_mX_n$ solution. The clay is again re-suspended, for example using a spatula, shaken as before, and then centrifuged. Washing with de-ionized water is preferably repeated until an aliquot of the supernatant of the centrifuged sample affords little to no precipitate when treated with a few drops of 1 molar $AgNO_3$ (aq.), indicating that the sample is free or substantially free of chloride ions.

While the above cation exchange procedure is described in terms of a laboratory method, scale-up to industrial scale is readily carried out.

After the final wash with de-ionized water and centrifugation, the supernatant is discarded and the ion-exchanged, pillared clay sample is dried in a vacuum oven (−30 in. Hg) at about 60° C. to sufficient dryness so that it can be readily ground, for example, using a mortar and pestle. The resulting fine powder is placed in an oven and calcined for 4-6 hours at a temperature of about 250° C. to about 500° C., before being cooled to room temperature (approximately 20-25° C.) under high vacuum. Air is removed from the sample by subjecting it to high vacuum during and/or after drying and cooling, and replacing the atmosphere with argon for several vacuum cycles before transferring it to a glove box containing an inert atmosphere (such as argon) for further use.

(d) Preparation of metallocene-trialkylaluminum solutions:

Commercially prepared triisobutylaluminum, 25 wt % in toluene, as well as neat triisobutyl aluminum (TIBAL) (Sigma Aldrich Chemical Co. LLC) and commercially prepared bis(n-butylcyclopentadienyl)zirconium dichloride, $(n-BuCp)_2ZrCl_2$ (Boulder Scientific Co.) are used in the following preparations.

Standard stock solutions of metallocene are prepared for deposition on the pillared and $Met_mX_n$ exchanged clay prepared as described above (or, in comparative example, clay in the absence of modification). In some of the examples, the metallocene is dissolved in neat TIBAL. For example, 0.1530 gm of (n-BuCp)$_2$ZrCl$_2$ is weighed directly into a 4 dram vial followed by the addition of 7.75 mL of neat TIBAL. In another example, 0.170 g of (1-Bu-3-MeCp)$_2$ ZrCl$_2$ is dissolved in 150 mL of dried, de-gassed heptane. In another example, 0.1674 g rac-EBTHI-ZrCl$_2$ [EBTHI=1,2-ethylene-1,1'-bis($\eta^5$-tetrahydroindenyl)] is dissolved in 150 mL toluene.

(e) Preparation of Catalyst:

Typically, catalyst is prepared under an inert atmosphere of argon in a glovebox using the following procedure.

Calcined, pillared and exchanged clay prepared as described above is charged to an oven-dried vial. A metallocene stock solution containing trialkylaluminium is charged in an amount to provide a metallocene to clay ratio of about $7 \times 10^{-5}$ mmol metallocene/mg calcined clay, preferably pillared and ion-exchanged clay in examples of the invention. Alternatively, using a metallocene stock solution not containing trialkylaluminum, first a trialkylaluminium solution, typically triisobutylaluminum, about 25 wt % in hydrocarbon solvent, is added to the modified clay, followed by the metallocene stock solution as described above. The total amount of trialkylaluminum added is typically 0.033 mg Al per mg clay (alternatively, lower or higher ratios can be used). The mixture containing the modified clay, metallocene and trialkylaluminium are gently mixed, such as by swirling by hand for several seconds, and the mixture is allowed to "age or mature", for example by remaining in the vial without further mixing, for no less than 1 hr. before being transferred to a stainless steel charge vessel. Additional dry, degassed heptane can be added to assist in transferring solids to the catalyst charge vessel.

More specifically, the following procedure is used for catalyst preparation:

Catalyst preparation is typically performed in a glovebox under a dry, argon atmosphere. Amounts for a given experiment can be varied. In an embodiment, approximately 100 milligrams of ion-exchanged pillared clay (IEPC) (or clay, or modified clay) is weighed directly into a 20 mL glass vial. To the vial is charged 2.1 mL of 1.6 M triethylaluminum in hexane via syringe. The vial is swirled twice to mix the contents. Metallocene stock solution (metallocene in heptane) is injected into the vial to afford a ratio of $8 \times 10^{-5}$ mmol metallocene:mg IEPC. The vial is capped and allowed to age undisturbed for 1 hr before charging to a stainless steel charge vessel.

To charge to a stainless steel charge vessel, first the supernatant of the catalyst slurry from above is siphoned off and put into a separate, clean vial. Then, using a 3 ml transfer pipette, roughly 1 ml of the supernatant is withdrawn from the second vial and is used to re-slurry the catalyst solids. Before the solids have a chance to settle, a portion of the catalyst slurry is withdrawn using the same transfer pipette and is transferred to the catalyst charge vessel. This process is repeated until all of the catalyst solids have been transferred. In the event that the amount of supernatant isn't sufficient to transfer all of the solids, a sufficient dry heptane is used to complete the transfer of all the solids to the charge vessel. The charge vessel is removed from the glovebox and is taken to the polymerization reactor for testing.

(f) Olefin Polymerization

Homo-polymerization of ethylene is conducted in a dry 2 L stainless steel "Zipper-clave" reactor using 1 L isobutane diluent. The selected pressure, e.g. 450 total psi and temperature, e.g. 90° C. in the reactor are maintained electronically by an ethylene mass flow controller and jacketed steam-coolant-equipped temperature control skid.

When using hydrogen, a pre-mixed gas feed tank of purified hydrogen and ethylene are used to maintain the desired total reactor pressure, with a high enough pressure in the feed tank so as not to significantly change the ratio of ethylene:hydrogen in the feed to the reactor. Addition of hydrogen can affect melt index of the polymer obtained with a given catalyst.

Moisture is first removed from the reactor interior by pre-heating the reactor to at least 115° C. under argon flow, which is maintained for at least 15 minutes. Stirring is provided by a marine-type impellor and Magnadrive™. The catalyst charge vessel contents are charged to the reactor by flushing them in with 1 L isobutane. The reactor impellor is turned on with a set-point of, e.g., 500 rpm. The reactor temperature control system is turned on and is allowed to reach the temperature set-point (typically requiring about 7 minutes). The reactor is brought to run pressure by opening a manual feed valve for the ethylene. When the run pressure is reached, reactor pressure is controlled by the mass flow controller. The consumption of ethylene and temperature are monitored electronically. During the course of the polymerization, with the exception of the initial charge of catalyst during the first few minutes of the run, the reactor temperature is maintained at the set point temperature ±1° C. After 60 minutes, or after the designated run time, the polymerization is stopped by shutting off the ethylene inlet valve and venting the isobutane. The reactor is returned to ambient temperature. The polymer is then removed from the reactor and dried and the polymer weight is used to calculate the activity of the particular polymerization. Polymer melt indexes, i.e. melt index (MI) and high load melt index (HLMI), are obtained after stabilization of the polymer with butylated hydroxytoluene (BHT) according to ASTM procedures D618-05 and D1238-04C. Polymer density is measured according to ASTM D1505-03.

Copolymerization is conducted in a similar manner to homopolymerization described above, only typically with set-points of 350 total psi and 80° C. and using dried and degassed alpha-olefin such as 1-hexene, which is charged via addition to the catalyst stainless steel charge vessel just prior to attachment to the reactor.

A copolymerization example is conducted according to the above conditions using 1-hexene with Ce-ACH pillared HPM clay, MgCl$_2$ ion exchange salt, exchanged and washed 5 times with de-ionized water and (1-Bu-3-MeCp)$_2$ZrCl$_2$ metallocene, and TIBAL and TEAL scavengers. Catalyst activity is 1814 g/g·hr and the copolymer produced exhibits a melt index of 0.5704, a HLMI of 9.07 and ratio of HLMI/MI of 15.90.

Comparative Example 1

The same polymerization procedures as described above are used in order to provide a comparative example using the same metallocene catalyst and aluminum-containing cocatalyst, except that the pillared clay support comprising cerium is not ion-exchanged with a metal salt. The same process as described above is used to prepare the pillared support and the supported catalyst is prepared according to the same procedure as above.

Examples and results obtained according to the procedures described above are summarized in the following table.

TABLE 1

Effect of multiple 0.1M MetCl$_2$ ion exchanges and de-ionized water washes (number preceding "X" indicates number of times) on catalyst activity using Ce/ACH pillared and ion exchanged Montmorillonite, and (1-Bu-3-MeCp)$_2$ZrCl$_2$ metallocene, triethylaluminum catalyst composition; activity values are reported with a subscript indicating the calcining temperature (° C.) used in connection with the experiment that generated the activity value.

Ce/ACH Pillared
$173_{200}$
$300_{300}$

| Ion Exchange (IE) and Water Wash (as indicated) MgCl$_2$ (9.5 pH) 3X Ion Exchange | | | | Ion Exchange (IE) and Water Wash (as indicated) ZnCl$_2$ (6.2 pH) 3X Ion Exchange | | | |
|---|---|---|---|---|---|---|---|
| (1) 5.0 pH | (2) | (3) | (4) | (1) 4.86 pH | (2) | (3) | (4) |
| 4X H$_2$O 4.25 pH $1082_{200}$ $1357_{300}$ | 1X IE 4.99 pH | 2X IE 4.98 pH | 3X IE 4.95 pH | 4X H$_2$O 4.25 pH $1436_{200}$ $1275_{300}$ | 1X IE | 2X IE | 3X IE |
| 6X H$_2$O 4.3 pH $1181_{200}$ $1710_{300}$ | 6X H$_2$O 4.22 pH $530_{200}$ $1053_{300}$ | 6X H$_2$O 4.2 pH $495_{200}$ $932_{300}$ | 4X H$_2$O 4.21 pH $1196_{200}$ $1077_{300}$ | 6X H$_2$O 4.24 pH $823_{200}$ $1543_{300}$ | 6X H$_2$O 4.24 pH $1320_{200}$ $971_{300}$ | 6X H$_2$O 4.35 pH $441_{200}$ $742_{300}$ | 4X H$_2$O 4.96 pH $1002_{200}$ $580_{300}$ |
| — | — | 3X H$_2$O 4.32 pH $731_{200}$ $1835_{300}$ | 4X H$_2$O 4.28 pH $624_{200}$ $1195_{300}$ | — | — | 3X H$_2$O 4.41 pH $837_{200}$ $1402_{300}$ | 2X H$_2$O 4.65 pH $423_{200}$ $921_{300}$ |
| — | — | — | — | — | — | — | 2X H$_2$O 4.53 pH $384_{200}$ $1388_{300}$ |

A series of polymerization runs are conducted in order to determine the effect of hydrogen on the polymerization of ethylene using supported catalysts prepared according to the procedures disclosed hereinabove. The polymerization conditions and results obtained are summarized in Table 2. These data confirm that supported catalysts of the invention perform as expected for the metallocenes employed even in the absence of an aluminoxane.

TABLE 2

Effect of Hydrogen on Melt Flow Properties

| Run No. | Catalyst Support* | MCN[+] | H$_2$ added to mix tank (psi) | Total mix tank (H$_2$ + C$_2$) (psi) | Polymer Yield (gm) | Catalyst Activity g/g*hr | MI | HLMI | HMLI/MI |
|---|---|---|---|---|---|---|---|---|---|
| 1 | HPM-20 MgCl$_2$-4 | A | 1.1 | 700 | 117 | 2334 | 0.0851 | 1.56 | 18.3 |
| 2 | " | A | 4.3 | 690 | 94 | 1878 | 3.5 | 57.24 | 16.4 |
| 3 | " | A | 6.9 | 660 | 40 | 776 | 30.62 | — | 0.0 |
| 4 | " | A | 2.4 | 750 | 144 | 2872 | 0.23 | 3.73 | 16.2 |
| 5 | " | A | 0.5 | 740 | 45 | 916 | 0.04 | 0.67 | 16.0 |
| 6 | " | A | 0.5 | 740 | 110 | 2028 | — | 0.46 | — |
| 7 | " | B | 1 | 740 | 58 | 1192 | 0.19 | 3.96 | 20.8 |
| 8 | " | B | 4 | 740 | 57 | 1167 | 1.04 | 22.03 | 21.2 |
| 9 | " | B | 7 | 760 | 61 | 1156 | 2.61 | 50.86 | 19.5 |
| 10 | " | B | 10 | 750 | 73 | 1421 | 3.32 | 67.05 | 20.2 |
| 11 | " | B | 0 | 450 | 48 | 924 | 0.103 | 1.93 | 18.8 |
| 12 | " | B | 0 | 450 | 52 | 1028 | 0.073 | 1.56 | 21.4 |

Footnotes:
Conditions for all polymerization runs: finished catalyst charge approx. 50 mg, 3.94 × 10$^{-3}$ mmol for runs 1-6, 3.96 × 10$^{-3}$ mmol for runs 7-12; ethylene (C$_2$) pressure setpoint = 450 (psi); temp. = 90° C.; duration = 60 min.; calcination temp. = 300° C.; R$_3$Al added (mmol): 1.65 (Runs 1-6); 1.64 (Runs 7-12); TIBAL added Runs 1-6, 1.65 mL; TEAL added, Runs 7-12, 0.9 mL; MCN added: Runs 1-6, 3.94 × 10$^{-3}$ mmol, Runs 7-12, 3.96 × 10$^{-3}$ mmol
*HPM-20 = Volclay brand montmorillonite (American Colloid Company, Hoffman Estates, Ill); Ce-containing ACH pillar; ion exchanged 4 times with MgCl$_2$
[+]Metallocene (MCN): A = (n-BuCp)$_2$HfCl$_2$; B = (1-butyl-3-methylCp)$_2$ZrCl$_2$ The following enumerated paragraphs illustrate various and alternative embodiments of the present invention:

1. An intercalated modified and calcined smectite clay comprising:
   (a) pillars comprising aluminum and:
      (i) at least one rare earth or lanthanide group metal; or
      (ii) at least one rare earth or lanthanide group metal and gallium; and
   (b) at least one ion-exchanged metal selected from the group consisting of aluminum, barium, calcium, cerium, cesium, copper, chromium, gadolinium, gallium, germanium, hafnium, holmium, iron (II and III), lanthanum, lithium, magnesium, manganese, neodymium, potassium, praseodymium, rubidium, samarium, silver, selenium, sodium, strontium, tellurium, terbium, thallium, thorium, tin, titanium, uranium, ytterbium, yttrium, zinc and zirconium;
   wherein said clay is characterized by a basal $d_{001}$ spacing equal to or greater than about 18.5 angstroms.

2. The clay of paragraph 1 comprising at least one rare earth or lanthanide group metal or at least one rare earth or lanthanide group metal and gallium and wherein said clay is characterized by a basal $d_{001}$ spacing equal to or greater than about 18.5 angstroms after calcination at 110° C. to 800° C.

3. The clay of paragraph 2 wherein the pillars comprise at least one of cerium or lanthanum.

4. The clay of paragraph 1 wherein the clay is selected from the group consisting of montmorillonite, bentonite, hectorite, beidellite, saponite, nontronite, sauconite, fluorhectorite, and mixtures thereof.

5. The clay of any one of paragraphs 1-4 characterized by a basal $d_{001}$ spacing equal to or greater than about 18.5 angstroms and equal to or less than about 100 angstroms after calcination at 110° C. to 800° C.

6. The clay of any one of paragraphs 1-5 comprising at least one deposited metal selected from the group consisting of catalytically active transition metals of Groups 3-10 of the Periodic Table and optionally at least one organoaluminum compound.

7. A process for producing an intercalated modified and calcined smectite clay composition comprising steps:
   (A) contacting an aqueous slurry comprising a smectite clay with an aqueous pillaring agent comprising aluminum and: (i) at least one rare earth or lanthanide group metal; or (ii) at least one rare earth or lanthanide group metal and gallium; to form a solids-containing phase and an aqueous phase;
   (B) separating the solids-containing phase from the aqueous phase formed in (A);
   (C) contacting the separated solids obtained in (B) at least once with an aqueous $Met_mX_n$ composition comprising at least one $Met_mX_n$ compound, wherein $Met_m$ is at least one metal ion selected from the group consisting of aluminum, barium, calcium, cerium, cesium, copper, chromium, gadolinium, gallium, germanium, hafnium, holmium, iron (II and III), lanthanum, lithium, magnesium, manganese, neodymium, potassium, praseodymium, rubidium, samarium, silver, selenium, sodium, strontium, tellurium, terbium, thallium, thorium, tin, titanium, uranium, ytterbium, yttrium, zinc and zirconium, and $X_n$ comprises at least one anionic species; and m and n=numerals that together satisfy the valence requirement for the combination of $Met_m$ and $X_n$, to form a mixture comprising a solids-containing phase and an aqueous phase;
   (D) separating the aqueous phase formed in (C) in order to form a new solids-containing phase;
   (E) drying the separated, solids-containing phase from (D) in order to obtain dry solids and reducing said dry solids to a dry, particulate form; and
   (F) calcining the dry, particulate from (E) to form a dry, pillared, solid catalyst support-activator in particulate form.

8. The process of paragraph 7, wherein $X_n$ comprises at least one anionic species independently selected from the group consisting of a halide selected from the group consisting of chloride, iodide, fluoride and bromide; bromate; chlorate; perchlorate; sulfate; sulfamate; carbonate; hydrogen-carbonate; carbamate; nitrite; nitrate; oxalate; phosphate; selenate; sulfamate; azide; alkoxide; amide, including $NR_2$ or $R[CON(R)]_a$, wherein R is independently H or a $C_1$-$C_{20}$ unsubstituted or substituted hydrocarbyl group and a=1-4; and carboxylate, including $R[CO_2]_b$, wherein R is independently H or a $C_1$-$C_{20}$ unsubstituted or substituted hydrocarbyl group and b=1-4.

9. The process of paragraph 8 wherein $Met_mX_n$ is selected from the group consisting of $MgF_2$, $MgCl_2$, LiCl, $Mg(OAc)_2$, $Mg(NO_3)_2$, $ZnCl_2$, NaCl, CsCl, $ZnSO_4$, KCl, $CaCl_2$, RbCl, LiCl, $CuCl_2$, $CuSO_4$, $FeCl_3$, $CoCl_2$, and mixtures thereof.

10. The process of paragraph 9 wherein $Met_mX_n$ is $MgCl_2$ or $ZnCl_2$ or a mixture of $MgCl_2$ and $ZnCl_2$.

11. The process of any one of paragraphs 8 to 10 wherein following separation of the solids-containing phase in (B), the solids-containing phase is extracted at least once with water.

12. The process of paragraph 11 wherein water extraction is repeated until upon separation from the solids, the separated water is free or substantially free of: (i) residual anions originally present in the aqueous pillaring agent; or (ii) unconsumed pillaring agent or byproduct thereof; or (iii) both (i) and (ii).

13. The process of paragraph 12 wherein free or substantially free is confirmed by a conductance value of less than 20,000 μS/cm or a negative $AgNO_3$ test result, or both.

14. The process of paragraph 8 wherein contacting with $Met_mX_n$ is carried out from 2 to about 10 times, and wherein $Met_mX_n$ used in more than one contacting step is the same or different as $Met_mX_n$ used in a prior contacting step, and including a separating step as in (D) between one or more contacting step.

15. The process of any one of paragraphs 8-14, wherein the pillaring agent is selected from the group consisting of a basic aluminum complex, a basic zirconium complex, a basic chromium complex and mixtures thereof.

16. The process of paragraph 8 or paragraph 14, wherein the concentrations of the clay and aqueous pillaring agent in step (A) are sufficient to result in the formation of pillars.

17. The process of paragraph 8 or paragraph 14, wherein the concentration of $Met_mX_n$ is about 0.0001 molar to 10 about molar.

18. The process of paragraph 8 wherein the aqueous pillaring agent comprises aluminum at a concentration of about 0.1 to about 30 wt % $Al_2O_3$.

19. The process of paragraph 8 wherein the concentration of $Met_mX_n$ in the aqueous $Met_mX_n$ composition is about 0.0001 molar to about 10 molar.

20. The process of any one of paragraphs 8 to 12 wherein following separation of the solids-containing phase in (D), the new solids-containing phase is extracted at least once with water.

21. The process of any one of paragraphs 8 to 12 or 20, wherein water extraction is repeated until upon separation from the solids, the separated water is free or substantially free of: (i) residual anions originally present in the $Met_mX_n$ composition; or (ii) unconsumed $Met_mX_n$ composition or byproduct thereof; or (iii) both (i) and (ii).

22. The process of any of paragraphs 1-21, wherein calcining is conducted at a temperature in the range of about 110° C. to about 800° C. for about 1 hr. to about 10 hrs.

23. A process for producing an intercalated modified and calcined smectite clay composition comprising steps:
  (A) contacting an aqueous slurry comprising a smectite clay with an aqueous pillaring agent comprising aluminum and: (i) at least one rare earth or lanthanide group metal; or (ii) at least one rare earth or lanthanide group metal and gallium; to form a solids-containing phase and an aqueous phase;
  (B) separating the solids-containing phase from the aqueous phase formed in (A) and repeatedly extracting the solids-containing phase with water and separating the water from the solids until the separated water is free or substantially free of: (i) residual anions originally present in the aqueous pillaring agent; or (ii) unconsumed pillaring agent or byproduct thereof; or (iii) both (i) and (ii);
  (C) contacting the solids obtained in (B) at least once with an aqueous $Met_mX_n$ composition comprising at least one $Met_mX_n$ compound, wherein $Met_m$ is at least one metal ion selected from the group consisting of aluminum, barium, calcium, cerium, cesium, copper, chromium, gadolinium, gallium, germanium, hafnium, holmium, iron (II and III), lanthanum, lithium, magnesium, manganese, neodymium, potassium, praseodymium, rubidium, samarium, silver, selenium, sodium, strontium, tellurium, terbium, thallium, thorium, tin, titanium, uranium, ytterbium, yttrium, zinc and zirconium, and $X_n$ comprises at least one anionic species; and m and n=numerals that together satisfy the valence requirement for the combination of $Met_m$ and $X_n$, to form a mixture comprising a solids-containing phase and an aqueous phase;
  (D) separating the aqueous phase formed in (C) in order to form a new solids-containing phase and contacting and mixing the new solids-containing phase with a new portion of aqueous $Met_mX_n$ composition, wherein Met and $X_n$ are the same or different chemical species as selected in (C) and mixing and separating the resulting mixture comprising a solids-containing phase and an aqueous phase;
  (E) optionally repeating step (D) at least one additional time, wherein following the last mixing and contacting with the $Met_mX_n$ composition, water-washing by introducing distilled or de-ionized water to the separated solids-containing phase to form a solids-containing composition, mixing and separating the composition into a solids-containing phase and an aqueous phase;
  (F) repeating the water-washing of step (E) until the separated aqueous phase is free or substantially free of $X_n$ ions in order to obtain a washed solids-containing phase;
  (G) drying the washed solids-containing phase from (F) in order to obtain dry solids and reducing said dry solids to a dry, particulate form; and
  (H) calcining the dry, particulate from (G) to form a dry, solid catalyst support-activator in particulate form.

24. The process of paragraph 23, wherein $X_n$ comprises at least one anionic species independently selected from the group consisting of a halide selected from the group consisting of chloride, iodide, fluoride and bromide; bromate; chlorate; perchlorate; sulfate; sulfamate; carbonate; hydrogen-carbonate; carbamate; nitrite; nitrate; oxalate; phosphate; selenate; sulfamate; azide; alkoxide; amide, including $NR_2$ or $R[CON(R)]_a$, wherein R is independently H or a $C_1$-$C_{20}$ unsubstituted or substituted hydrocarbyl group and a=1-4; and carboxylate, including $R[CO_2]_b$, wherein R is independently H or a $C_1$-$C_{20}$ unsubstituted or substituted hydrocarbyl group and b=1-4.

25. The process of paragraph 23 wherein the addition of $Met_mX_n$ in step (E) is repeated from 1 to 10 times.

26. The process of any one of paragraphs 23-25 wherein free or substantially free is confirmed by a conductance value of less than 20,000 μS/cm or a negative $AgNO_3$ test result, or both.

27. The process of any one of paragraphs 23-26 wherein $Met_mX_n$ is selected from the group consisting of $MgF_2$, $MgCl_2$, LiCl, $Mg(OAc)_2$, $Mg(NO_3)_2$, $ZnCl_2$, NaCl, CsCl, $ZnSO_4$, KCl, $CaCl_2$, RbCl, LiCl, $CuCl_2$, $CuSO_4$, $FeCl_3$, $CoCl_2$, and mixtures thereof.

28. The process of paragraph 27 wherein $Met_mX_n$ is $MgCl_2$ or $ZnCl_2$ or a mixture of $MgCl_2$ and $ZnCl_2$.and step (E) is repeated up to 8 times.

29. The process of any one of paragraphs 23-28 wherein the water-washed solids-containing phase from step (E) or (F) is washed with distilled or de-ionized water from 1 to 10 times prior to carrying out steps (G) and (H).

30. The process of any of paragraphs 23-28 wherein $X_n$ is $Cl^-$ and step (F) comprises adding an aqueous solution of $AgNO_3$ to the separated aqueous phase wherein the absence of a precipitate confirms that the separated aqueous phase is free or substantially free of $Cl^-$ ion.

31. The process of any of paragraphs 23-30, wherein calcining is conducted at a temperature in the range of about 110° C. to about 800° C. for about 1 hr. to about 10 hrs.

32. The process of paragraph 23 wherein the addition of $Met_mX_n$ in step (E) is repeated z times, where z is a number from 1 to 10.

33. An intercalated modified and calcined smectite clay produced by the process of any of paragraphs 7-32, which is suitable for use as an olefin polymerization catalyst support-activator.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, $R_L$, and an upper limit $R_U$, is disclosed, any number R falling within the range is specifically disclosed. In particular, the following numbers R within the range are specifically disclosed: $R=R_L+k(R_U-R_L)$, wherein k is a variable ranging from 1% to 100% with a 1% increment, e.g., k is 1%, 2%, 3%, 4%, 5% . . . 50%, 51%, 52% . . . 95%, 96%, 97%, 98%, 99%, or 100%. Moreover, any numerical range represented by any two values of R, as calculated above is also specifically disclosed.

The invention claimed is:

1. An intercalated modified and calcined smectite clay comprising:
   (a) pillars comprising aluminum and:
      (i) at least one rare earth or lanthanide group metal; or
      (ii) at least one rare earth or lanthanide group metal and gallium; and
   (b) said clay comprising at least one ion-exchanged metal selected from the group consisting of magnesium, and zinc; and
   wherein said clay is characterized by a basal $d_{001}$ spacing equal to or greater than about 18.5 angstroms and equal to or less than about 100 angstroms; and
   wherein said clay activates a metallocene catalyst supported by said clay for olefin polymerization in the absence of aluminoxane or borate activators.

2. The clay composition of claim 1 wherein the pillars comprise at least one of cerium or lanthanum.

3. The clay composition of claim 1 comprising at least one deposited metal selected from the group consisting of catalytically active transition metals of Groups 3-10 of the Periodic Table and optionally at least one organoaluminum compound.

4. The clay composition of claim 1 wherein said clay is characterized by a basal $d_{001}$ spacing equal to or greater than 30 angstroms and equal to or less than 100 angstroms.

5. The clay composition of claim 3 comprising at least one organoaluminum compound.

6. A process for producing an intercalated modified and calcined smectite clay composition comprising steps:
   (A) contacting an aqueous slurry comprising a smectite clay with an aqueous pillaring agent comprising at least one of aluminum, zirconium or chromium and: (i) at least one rare earth or lanthanide group metal; or (ii) at least one rare earth or lanthanide group metal and gallium; to form a solids-containing phase and an aqueous phase;
   (B) separating the solids-containing phase from the aqueous phase formed in (A);
   (C) contacting the separated solids obtained in (B) at least once with an aqueous $Met_m X_n$ composition comprising at least one $Met_m X_n$ compound, wherein $Met_m$ is at least one metal ion selected from the group consisting of magnesium, and zinc, and $X_n$ comprises at least one anionic species; and m and n=numerals that together satisfy the valence requirement for the combination of $Met_m$ and $X_n$, to form a mixture comprising a solids-containing phase and an aqueous phase;
   (D) separating the aqueous phase formed in (C) in order to form a new solids-containing phase;
   (E) drying the separated, solids-containing phase from (D) in order to obtain dry solids and reducing said dry solids to a dry, particulate form; and
   (F) calcining the dry, particulate from (E) to form a dry, pillared, solid olefin metallocene catalyst support-activator in particulate form.

7. The process of claim 6, wherein $X_n$ comprises at least one anionic species independently selected from the group consisting of a halide selected from the group consisting of chloride, iodide, fluoride and bromide; bromate; chlorate; perchlorate; sulfate; sulfamate; carbonate; hydrogen-carbonate; selenate; sulfamate; nitrite; nitrate; oxalate; phosphate; selenate; sulfamate; azide; alkoxide; amide, including $NR_2$ or $R[CON(R)]_a$, wherein R is independently H or a $C_1$-$C_{20}$ unsubstituted or substituted hydrocarbyl group and a=1-4; and carboxylate, including $R[CO_2]_b$, wherein R is independently H or a $C_1$-$C_{20}$ unsubstituted or substituted hydrocarbyl group and b=1-4.

8. The process of claim 6 wherein following separation of the solids-containing phase in (B), the solids-containing phase is extracted at least once with water.

9. The process of claim 8 wherein water extraction is repeated until upon separation from the solids, the separated water is free or substantially free of: (i) residual anions originally present in the aqueous pillaring agent; or (ii) unconsumed pillaring agent or byproduct thereof; or (iii) both (i) and (ii); wherein free or substantially free is confirmed by a conductance value of less than 20,000 μS/cm or a negative $AgNO_3$ test result, or both.

10. The process of claim 6 wherein contacting with $Met_m X_n$ is carried out from 2 to about 10 times, and wherein $Met_m X_n$ used in more than one contacting step is the same or different as $Met_m X_n$ used in a prior contacting step, and including the separating step as in (D) between one or more contacting step.

11. The process of any one of claim 6, wherein the pillaring agent is selected from the group consisting of a basic aluminum complex, a basic zirconium complex, a basic chromium complex and mixtures thereof.

12. The process of claim 6, wherein calcining is conducted at a temperature in the range of about 110° C. to about 800° C. for about 1 hr. to about 10 hrs.

13. The process of claim 7 wherein $Met_m X_n$ is selected from the group consisting of $MgF_2$, $MgCl_2$, $Mg(OAc)_2$, $Mg(NO_3)_2$, $ZnCl_2$, $ZnSO_4$, and mixtures thereof.

14. The process of claim 13 wherein $Met_m X_n$ is $MgCl_2$ or $ZnCl_2$ or a mixture of $MgCl_2$ and $ZnCl_2$.

15. A process for producing an intercalated modified and calcined smectite clay composition comprising steps:
   (A) contacting an aqueous slurry comprising a smectite clay with an aqueous pillaring agent comprising aluminum and: (i) at least one rare earth or lanthanide group metal; or (ii) at least one rare earth or lanthanide group metal and gallium; to form a solids-containing phase and an aqueous phase;
   (B) separating the solids-containing phase from the aqueous phase formed in (A) and repeatedly extracting the solids-containing phase with water and separating the water from the solids until the separated water is free or substantially free of: (i) residual anions originally present in the aqueous pillaring agent; or (ii) unconsumed pillaring agent or byproduct thereof; or (iii) both (i) and (ii); wherein free or substantially free is confirmed by a conductance value of less than 20,000 μS/cm or a negative $AgNO_3$ test result, or both;
   (C) contacting the solids obtained in (B) at least once with an aqueous $Met_m X_n$ composition comprising at least one $Met_m X_n$ compound, wherein $Met_m$ is at least one metal ion selected from the group consisting of magnesium, and zinc, and $X_n$ comprises at least one anionic species; and m and n=numerals that together satisfy the valence requirement for the combination of $Met_m$ and $X_n$, to form a mixture comprising a solids-containing phase and an aqueous phase;
   (D) separating the aqueous phase formed in (C) in order to form a new solids-containing phase and contacting and mixing the new solids-containing phase with a new portion of aqueous $Met_m X_n$ composition, wherein Met and $X_n$ are the same or different chemical species as selected in (C) and mixing and separating the resulting mixture comprising a solids-containing phase and an aqueous phase;

(E) optionally repeating step (D) at least one additional time, wherein following the last mixing and contacting with the $Met_mX_n$ composition, water-washing by introducing distilled or de-ionized water to the separated solids-containing phase to form a solids-containing composition, mixing and separating the composition into a solids-containing phase and an aqueous phase;

(F) repeating the water-washing of step (E) until the separated aqueous phase is free or substantially free of $X_n$ ions in order to obtain a washed solids-containing phase, wherein free or substantially free is confirmed by a conductance value of less than 20,000 µS/cm or a negative $AgNO_3$ test result, or both;

(G) drying the washed solids-containing phase from (F) in order to obtain dry solids and reducing said dry solids to a dry, particulate form; and (H) calcining the dry, particulate from (G) to form a dry, solid catalyst support-activator in particulate form.

16. The process of claim 15, wherein $X_n$ comprises at least one anionic species independently selected from the group consisting of a halide selected from the group consisting of chloride, iodide, fluoride and bromide; bromate; chlorate; perchlorate; sulfate; sulfamate; carbonate; hydrogen-carbonate; carbamate; nitrite; nitrate; oxalate; phosphate; selenate; sulfamate; azide; alkoxide; amide, including $NR_2$ or $R[CON(R)]_a$, wherein R is independently H or a $C_1$-$C_{20}$ unsubstituted or substituted hydrocarbyl group and a=1-4; and carboxylate, including $R[CO_2]_b$, wherein R is independently H or a $C_1$-$C_{20}$ unsubstituted or substituted hydrocarbyl group and b=1-4.

17. The process of claim 15 wherein the addition of $Met_mX_n$ in step (E) is repeated from 1 to 10 times.

18. The process of claim 15 wherein $Met_mX_n$ is selected from the group consisting of $MgF_2$, $MgCl_2$, $Mg(OAc)_2$, $Mg(NO_3)_2$, $ZnCl_2$, $ZnSO_4$, and mixtures thereof.

19. The process of claim 15 wherein the water-washed solids-containing phase from step (E) or (F) is washed with distilled or de-ionized water from 1 to 10 times prior to carrying out steps (G) and (H).

20. The process of claim 15, wherein calcining is conducted at a temperature in the range of about 110° C. to about 800° C. for about 1 hr. to about 10 hrs.

* * * * *